(12) United States Patent
Jnagal et al.

(10) Patent No.: US 7,711,789 B1
(45) Date of Patent: May 4, 2010

(54) QUALITY OF SERVICE IN VIRTUAL COMPUTING ENVIRONMENTS

(75) Inventors: Rohit Jnagal, Sunnyvale, CA (US); Venkatesh Babu Chitlur Srinivasa, Santa Clara, CA (US)

(73) Assignee: 3 Leaf Systems, Inc., Santa Clara, CA (US)

( * ) Notice: Subject to any disclaimer, the term of this patent is extended or adjusted under 35 U.S.C. 154(b) by 180 days.

(21) Appl. No.: 11/952,615

(22) Filed: Dec. 7, 2007

(51) Int. Cl.
*G06F 15/167* (2006.01)
*G06F 15/173* (2006.01)
*G06F 13/00* (2006.01)
*G06F 9/46* (2006.01)

(52) U.S. Cl. .................. 709/213; 709/226; 711/147; 718/104

(58) Field of Classification Search .......... 703/228; 709/228, 213, 226; 711/147; 718/104
See application file for complete search history.

(56) References Cited

U.S. PATENT DOCUMENTS

| | | | |
|---|---|---|---|
| 6,760,306 B1 * | 7/2004 | Pan et al. | 370/230 |
| 6,829,649 B1 * | 12/2004 | Shorey et al. | 709/235 |
| 7,126,913 B1 * | 10/2006 | Patel et al. | 370/230.1 |
| 2005/0068798 A1 * | 3/2005 | Lee et al. | 365/49 |
| 2005/0120102 A1 | 6/2005 | Gandhi et al. | |
| 2006/0028987 A1 * | 2/2006 | Gildfind et al. | 370/232 |
| 2007/0070908 A1 * | 3/2007 | Ghosh et al. | 370/236 |

OTHER PUBLICATIONS

CISCO Systems, Inc., "CISCO 10000 Series Router Quality of Service Configuration, Policing Traffic" @ 1992-2007 CISCO Systems, Inc., downloaded Dec. 3, 2007, pp. 6-1-6-34.
Barham, P., et. al., "Xen and the Art of Virtualization," University of Cambridge Computer Laboratory, @ 2003, SOSP '03, Oct. 19-22, 2003, Bolton Landing, New York.
Delchev, I., "Linux Traffic Control," Networks and Distributed Systems Seminar, International University Bremen, Spring 2006.
Pentaklos, O., "An Introduction to the InfiniBand Architecture," Published on O'Reilly Network (http://www.oreillynet.com), Feb. 4, 2002, downloaded Mar. 16, 2007.
Valenzuela, J.L., et. al., "A Hierarchical Token Bucket Algorithm to Enhance QoS in IEEE 802.11: Proposal, Implementation and Evaluation," Digital Object Identifier 10.1109/VETECF.2004.1400539, IEEE, vol. 4, Sep. 2004.
Matharu, H., "Evaluating high speed industry standard serial interconnects," Embedded Computing Design, Jul. 2005, IDT Inc., Santa Clara, California.
Reinemo, S., et. al., "An Overview of QoS Capabilities in InfiniBand, Advanced Switching Interconnect, and Ethernet," IEEE Communications Magazine, Jul. 2006, pp. 32-38, Sun Microsystems.

(Continued)

*Primary Examiner*—Ramy M Osman
*Assistant Examiner*—Uzma Alam
(74) *Attorney, Agent, or Firm*—Baker Botts L.L.P.

(57) ABSTRACT

Methods and apparatus facilitate the management of input/output (I/O) subsystems in virtual I/O servers to provide appropriate quality of services (QoS). A hierarchical QoS scheme based on partitioning of network interfaces and I/O subsystems transaction types are used to classify Virtual I/O communications. This multi-tier QoS method allows virtual I/O servers to be scalable and provide appropriate QoS granularity.

31 Claims, 13 Drawing Sheets

OTHER PUBLICATIONS

Kozyrakis, Christos, "Lecture 11: Architectural Support for Virtual Machines," Dept of Electrical Engineering, Stanford University (http://eeclass.stanford.edu/ee282), EE282—Fall 2005.

Astuti, D., "Packet Handling," Seminar on Trasnport of Multimedia Streams in Wireless Internet, downloaded Dec. 3, 2007.

Hussain, M., et. al., "Using OpenFabrics InfiniBand for HPC Clusters," Dell Power Solutions, Nov. 2006, pp. 59-61, Dell, Inc.

Heinanen, J., et. al., "A Single Rate Three Color Marker," @ The Internet Society 1999., pp. 1-6.

Fraser, K., et. al., "Reconstructing I/O," Technical Report, No. 596, Universtiy of Cambridge Computer Laboratory, Aug. 2004.

Warfield, A., et. al., "Facilitating the Develoment of Soft Devices," University of Cambridge Computer Laboratory, downloaded Mar. 16, 2007.

Wu, J., et. al., "Hierarchical Disk Sharing for Multimedia Systems," NOSSDAV '05, Jun. 13-14, 2005, Stevenson, Washington, @ 2005.

Sundarrajan, S., et. al., "Xen and Server Consolidation," Infosys, White Paper, Infosys Technologies Ltd., Jun. 2006.

Goldengerg, D., "InfiniBand Device Virtualization in Xen," Mellanox Technologies Ltd., Jan. 19, 2006.

Liu, J., et. al., "High Performance VMM-Bypass I/O in Virtual Machines," Technical Report OSU-CISRC-2/06-TR22, Feb. 2006.

Huang, W., et. al., "InfiniBand Support in Xen Virtual Machine Environment," Technical Report OSU-CISRC-10/05-TR63, Oct. 2005.

Liu, J., et. al., "Evaluating the Impact of RDMA on Storage I/O over InfiniBand*," Computer & Information Science,The Ohio State University, downloaded on Apr. 13, 2007.

Balaji, P. et. al., "On the Provision of Prioritization and Soft QoS in Dynamically Reconfigurable Shared Data-Centers over InfiniBand," Computer Science and Engineering, The Ohio State University, downloaded Apr. 12, 2007.

Sumimoto, S. et. al., "The RIKEN Super Combined Cluster and SCoreCluster System Software—Achieves 8.72 TFLOPS on Cluster of Clusters—", High Performance Computing and Grid in Asia Pacific Region Conference,@ Fujitsu Laboratories, Ltd, 2004.

Sumimoto, S. et. al., "PM/InfiniBand-FJ: A Design of High Performance Communication Facility Using InfiniBand for Large Scale PC Clusters," High Performance Computing and Grid in Asia Pacific Region Conference,@ Fujitsu Laboratories Tld., 2004.

Shipman, G., et. al., "Infiniband Scalability in Open MPI," Los Alamos National Laboratory, downloaded Apr. 12, 2007.

"Linus System Software for the InfiniBand* Architecture," Software Architecture Specification (SAS), Revision 1.0.1 Last Print Date Aug. 1, 2002.

Liu, J., et. al., "Building Multirail InfiniBand Clusters: MPI-Level Design and Performance Evaluation," Technical Report OSU-CISRC-5/04-TR26, May 2004.

Liu, J., et. al., "MPI over InfiniBand: Early Experiences," Technical Report OSU-CISRC-10/02-TR25, Oct. 2002.

OFED (OpenFabrics Enterprise Distribution), "High performance server and storage connectivity software for field-proven RDMA and Transport Offload hardware solutions," Mellanox Technologies, Linux Edition, Rev. 1.0 @ 2006.

Velusamy, V., et. al., "Programming the InfiniBand Network Architecture for High Performance Message Passing Systems," Mississippi State University, downloaded Apr. 12, 2007.

"Intel Architecture Based InfiniBand* Cluster," TeraFlops Off-The-Shelf (TOTS); downloaded Apr. 13, 2007.

Mellanox Technologies, Inc., "I/O Virtualization Using Mellanox InfiniBand and Channel I/O Virtualization (CIOV) Technology," @ 2007.

* cited by examiner

QUALITY OF SERVICE IN VIRTUAL COMPUTING ENVIRONMENTS

TECHNICAL FIELD

The present disclosure relates to the field of distributed computing systems and, more particularly, to the quality of service (QoS) management of virtualized input/output (I/O) subsystems in virtual I/O servers.

BACKGROUND

Enterprises have grown increasingly reliant on computing systems to accomplish mission-critical tasks. Such computing systems are becoming increasingly complicated and operate a heterogeneous mix of application servers and input/output (I/O) subsystems. To reduce cost and increase flexibility for application servers to access available I/O subsystems, virtual I/O servers can be used to create logical separations between the application servers and I/O subsystems to make the I/O subsystems as logical resource units to application servers.

While the move to virtual I/O servers increases flexibility, it also increases the complexity of management. The virtual I/O servers must be scalable to handle a large number of application servers with wide range of quality of service (QoS) requirements. Virtual I/O communications from application servers such as file transfers are high-bandwidth, latency-tolerant, and well-structured, while virtual I/O communications for Internet Protocol (IP) telephony application servers are low-bandwidth, low-latency, and bursty. Therefore, virtual I/O servers should provide the appropriate QoS granularity to meet the end-to-end QoS requirement of individual application servers. As the ratio of application servers to I/O subsystems increases, access contention, bandwidth constraint, and other issues developed.

Aggravating the complexity of managing virtual I/O servers is the assortment of attached I/O subsystems. I/O subsystems have different capacity and traffic characteristics. I/O subsystems devices such as fibre channel storage devices operate in a coordinated data transfer manner with defined data transfer size. In the other hand, I/O subsystems such as a local area network (LAN) network interface card (NIC) tends to have bursty traffic and randomized data size. To provide end-to-end QoS guarantees, virtual I/O servers not only need to estimate the workloads, configuring, sizing, and balancing of the diverse application servers, but also the assortment of I/O subsystems, to achieve optimal performance.

SUMMARY

The present invention provides methods and apparatuses directed to managing quality of service (QoS) in virtual input/output (I/O) servers that are scalable and provide appropriate quality of service (QoS) granularity in managing I/O subsystems. In a particular implementation, network fabric resources are allocated in a hierarchical arrangement. The hierarchy is based on partitioning of network interfaces and I/O subsystems transaction types, with QoS allocation decisions made on each hierarchy independently. This distributed transaction scheme provides scalable and fine-grain QoS management in virtual I/O servers.

In one implementation, a two-tier hierarchical QoS management process is employed in a virtual I/O server. In the ingress direction, the first hierarchical QoS process is performed by a fabric receive QoS manager on aggregated virtual I/O subsystem traffic from one or more I/O fabric interfaces. After virtual I/O communications are classified into I/O subsystems groups, a second hierarchical QoS process is performed on each group for further classification. A similar hierarchical QoS management process is used for egress virtual I/O subsystem traffic.

The foregoing is a summary, and thus contains simplifications, generalizations, and omissions of details. The transactions enclosed herein may be implemented in a number of ways including implementation in software or hardware such as special purpose integrated circuits. These and other advantage and features of the present invention will become apparent from the following description.

DESCRIPTION OF EXAMPLE EMBODIMENT(S)

Figure 1:
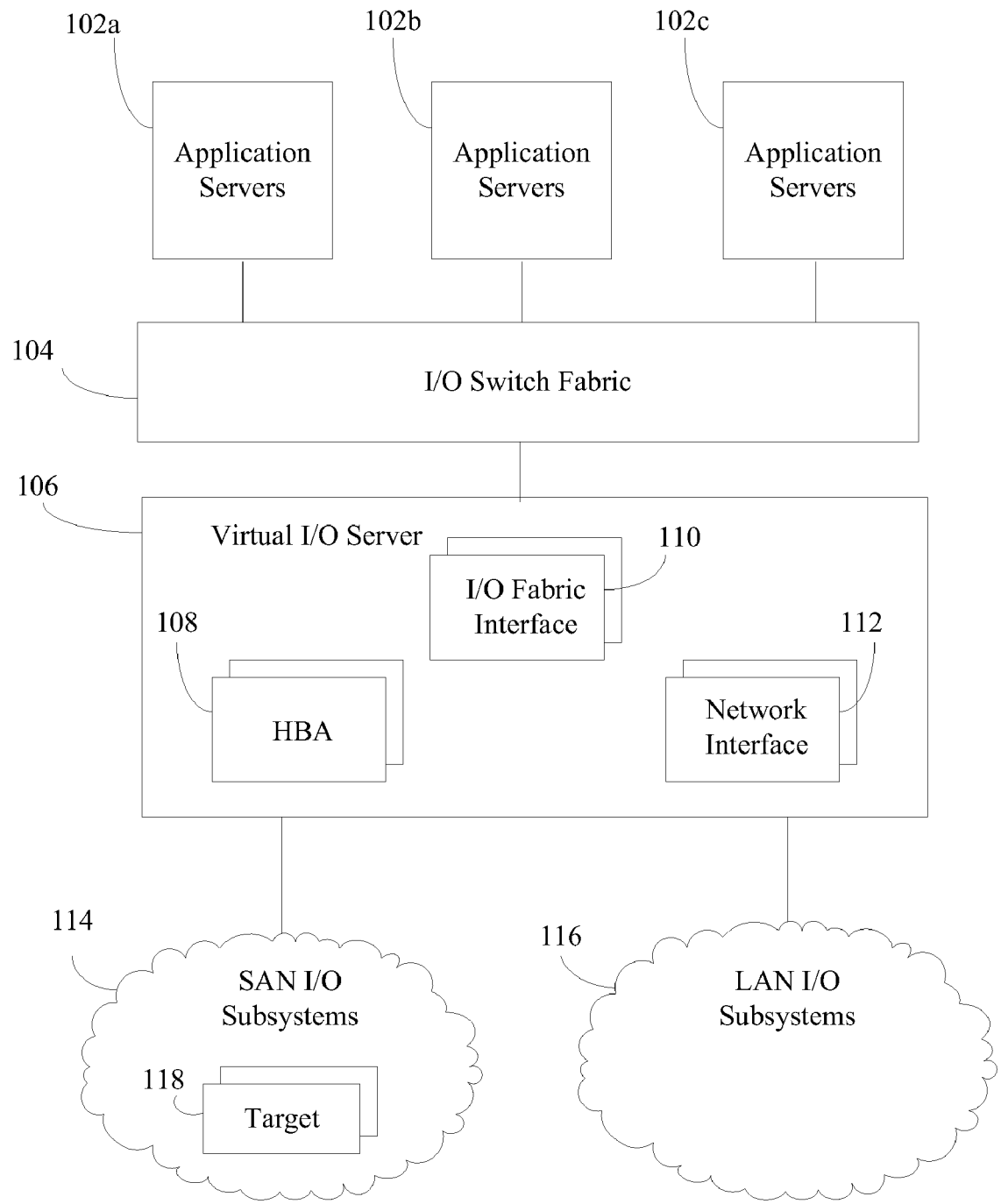
FIG. 1 is a functional diagram illustrating an I/O switch fabric interconnecting application servers and virtual I/O servers, with SAN I/O subsystems and LAN I/O subsystems attached to the virtual I/O server.

FIG. 1 illustrates input/output (I/O) switch fabric 104 interconnecting three application servers 102a-c (collectively referred to with reference number 102) and virtual I/O server 106. Storage area network (SAN) I/O subsystems 114 and local area network (LAN) I/O subsystems 116 are attached to virtual I/O server 106. In one implementation, virtual I/O server 106 has one or more host bus adapters (HBAs) 108 as physical storage network interface connecting with SAN I/O subsystems 114, and one or more network interfaces (NICs) 112 as physical LAN interface connecting with LAN I/O subsystems 116. Virtual I/O server 106 connects to the I/O switch fabric 104 through I/O fabric interface 110 such as Infiniband ports. Targets 118 are physical I/O devices such as fibre channel disk drive attached to SAN I/O subsystems 114, while network interfaces attach to a local area network 116 via a port, for example, to an Ethernet switch.

Virtual I/O server 106 provides the storage and external networking needs of application servers 102 connected to I/O switch fabric 104, allowing transparent, shared access to SAN I/O subsystems 114 and LAN I/O subsystems 116. Virtual I/O server 106 creates virtual device interfaces for application servers 102 to access the I/O subsystems as if the I/O subsystems are directly connected to application servers 102. One or more application servers 102 might be connected to the virtual I/O server 106 over I/O switch fabric 104, with multiple applications running on each application server initiating transactions to any of the I/O subsystems. Application servers 102 might include one or more virtual network interface modules to enhance the performance of their virtual access with SAN I/O subsystems 114 and LAN I/O subsystems 116. The type and frequency of accesses to I/O subsystems differ depending on applications. In applications such as system backup files transfer to a SAN device, the application's demand for bandwidth is usually high, has relaxed latency requirements, and occurs infrequently. In applications such as Internet Protocol telephony application, accesses to LAN I/O subsystems use little bandwidth, but require very low latency.

A. Hardware, Software, and Protocol Component Overview

The following provides an overview of the hierarchical QoS management hardware components and functional modules of a virtual I/O server 106 and application server 102 according to one possible implementation of the invention.

Figure 11:
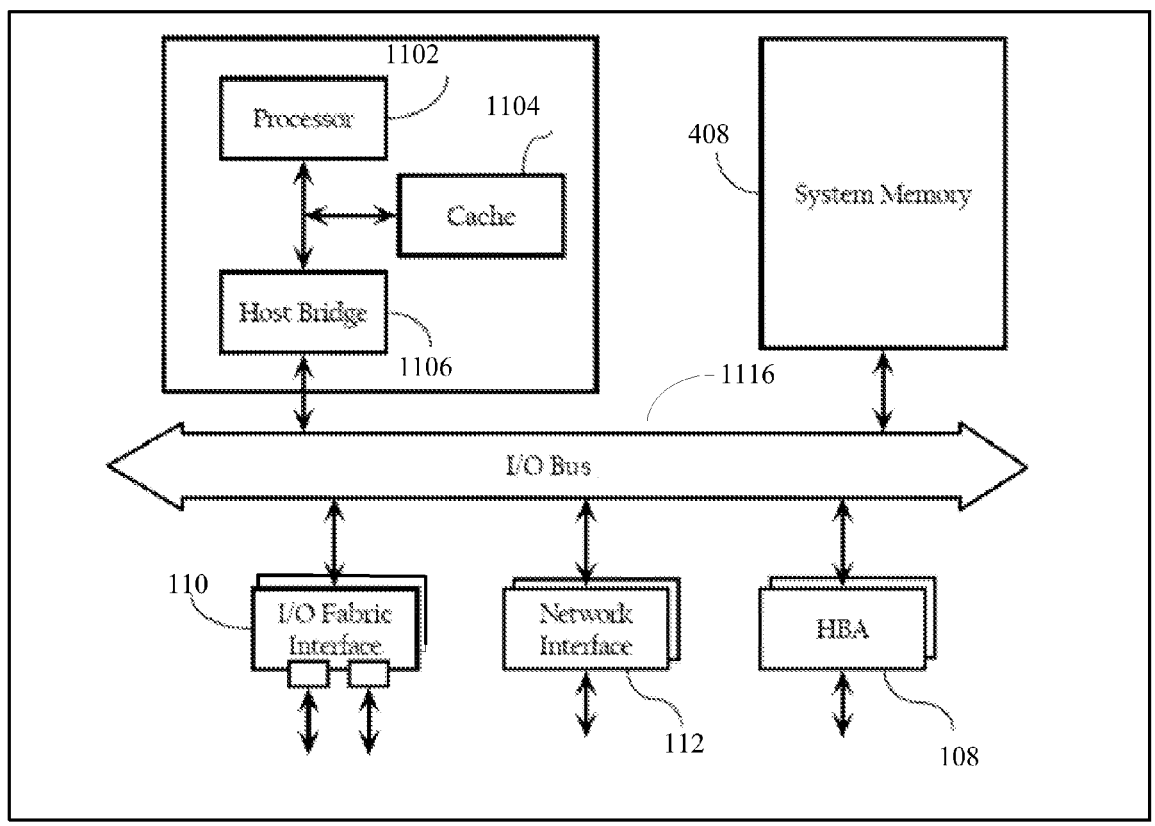
FIG. 11 is a component diagram showing one hardware implementation of the virtual I/O server QoS management process.

FIG. 11 illustrates an embodiment of a virtual I/O server 106, which compromises a processor 1102, a cache memory 1104, an operating system, and one or more software, firmware and/or hardware modules or drivers directed to the functions described herein. Additionally, it includes an input/output (I/O) bus 1116 and system memory 408. A host bridge 1106 couples processor 1102 to I/O bus 1116. I/O bus 1116 also couples to I/O fabric interface 110, network interface (NIC) 112 and host bus adapter (HBA) 108. HBA 108 is used to interface with SAN I/O subsystems 114 and NIC 112 is used to interface with LAN I/O subsystems 116. The present invention may be in the form of an I/O server application program residing in system memory 408 and executed in processor 1102. Alternatively, the present invention may be implemented at least in part by special purpose hardware such as ASICs in the form of a finite state machine.

A.1. Application Server Protocol Stack and Hardware Architecture

The application server 102 may be implemented with any suitable hardware platform, including a commodity blade platform with a PCI-Express bus. As discussed herein, an interface or adapter, in one implementation, operably connected on a PCI-Express bus is connected to one or more virtual I/O servers 106 through one or more fabric switches. In one implementation, the application server 102 includes a variety of network and storage stack drivers and modules. Inserted into the network and storage protocol stacks are virtual interface drivers configured to intercept storage and network I/O messages, at the device level, and pass them through the I/O fabric interface to a virtual I/O server 106 for processing. The virtual host bus adapter (HBA), emulating a physical HBA, receives SCSI commands for a given device and passes them to the virtual I/O server 106 over the I/O switch fabric. Similarly, virtual network interface, in one implementation, emulates an Ethernet NIC. In one implementation, this driver plugs in at the bottom of the network stack and provides an Internet Protocol address bridged by the Virtual I/O server 106 onto a LAN.

Virtualization at the device level, in some implementations, achieves one or more advantages. For example, particular implementations of the virtualization scheme described herein allow for use of existing computing infrastructures, including hardware and software, while abstracting the operation of the intermediate I/O switch fabric. Furthermore, in some implementations, the virtual I/O server uses existing device drivers to communicate with I/O subsystems eliminating the need to qualify new hardware or software for interacting with the I/O subsystems. In addition, in some implementations, the operating system kernel need not be modified since the device drivers and other stack modules can be loaded at boot time.

Figure 2:
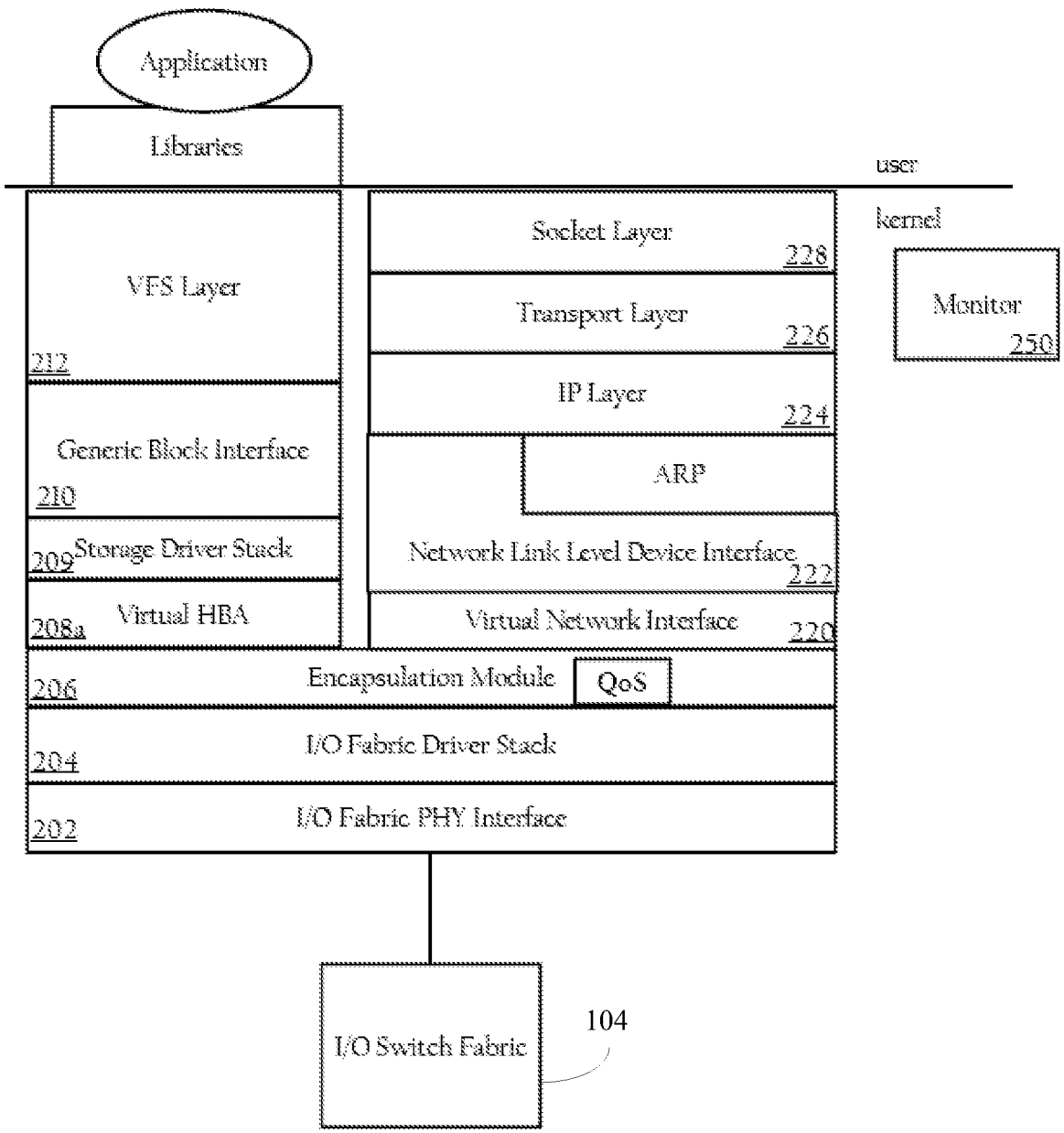
FIG. 2 is a schematic diagram illustrating a protocol stack and software modules of an application server according to an alternative implementation of the invention.

The following describes various protocol stack components and modules of the application server 102 according to one possible implementation of the invention. FIG. 2 illustrates the protocol stack and modules of an application server 102 according to one possible implementation of the invention. I/O fabric PHY interface 202 generally refers to the hardware interface or interconnection to the I/O switch fabric, while I/O fabric driver stack 204 generally refers to one or more drivers directed to the communication of messages across the I/O switch fabric. In one implementation, I/O fabric driver stack 204 comprises an Infiniband host channel adapter (HCA) driver layer and an Infiniband access layer. In one implementation, the I/O fabric driver stack and I/O fabric PHY interface can employ the Reliable Connections (RC) supported by the Infiniband standard. Equivalent protocols can be used for reliable and in-order message delivery across the I/O switch fabric. Furthermore, in one implementation, the I/O fabric PHY interface 202 and associated drivers supports remote direct memory access (RDMA), allowing for read and write operations directly with system memory without involvement of a central processing unit. Still further, other technologies (e.g., PCI express) and protocols (e.g. link layer protocols, such IEEE 802.3 (Ethernet)) across the I/O switch fabric can be used.

Encapsulation module 206 handles encapsulation processes associated with the virtualization of I/O subsystems between the application server 102 and one or more network interfaces 112 and host bus adapters 108 attached to virtual I/O server 106. In one implementation, encapsulation module 206 presents a generic interface to higher layer virtual interfaces, such as virtual HBA 208a. In one implementation, encapsulation module 206 is operative to consume messages from higher layers of the protocol stack, encapsulate messages with a header, and transmit messages, using I/O fabric protocol dependent modules, across the I/O switch fabric to virtual I/O server 106.

In one implementation, generic block interface 210 is a native, generic block interface standard to the underlying operating system of application server 102. Virtual file system (VFS) layer 212 provides a generic file system interface to applications and forwards requests to file system-specific code (such as FAT, EXT2, ISO9660, etc). For example, when an application issues a read system call, the system call may transfer control from user mode into the kernel and invokes the read VFS function. Internal kernel state associated with the open file directs the VFS read function to invoke the file-system specific read function, which will perform mapping operations to map the byte offset in the file to the physical block on the media. It then requests that block from the generic block interface 210 (which invokes the virtual block device interface 208a). In one implementation, virtual HBA layer 208a is operative to establish a connection with virtual block interface of virtual I/O server 106 to forward commands or other messages. In one implementation, this connection is a persistent, session layer connection utilizing a reliable transport protocol.

Virtual network interface 220 presents a virtual link layer interface to higher layers of the protocol stack. In one implementation, the virtual network interface 220 is used to access network interfaces of the virtual I/O server 106 over the I/O switch fabric, using the encapsulation module 206 to provide the interfaces to establish and maintain the connection. In one implementation, the virtual network interface layer 220 is configured with a link layer network interface profile (including a virtual media access control (MAC) address) that it receives from a virtual I/O server 106. In one implementation, the link layer network interface profile may include other attributes, such as a supported speed or bandwidth, and other NIC attributes that are presented to an operating system. In one implementation, above the virtual network interface 220 in the protocol stack are standard networking protocol implementation layers, such as network link level device interface 222, IP layer 224, transport layer 226 and socket layer 228.

In one implementation, application server 102 also includes a monitor module 250. In one implementation, monitor module 250 is a kernel loadable module that handles various management tasks associated with the virtual computing environment. For example, the monitor module 250 is operative to automatically discover nodes (e.g., other application servers 102, virtual I/O servers 106) connected to the I/O switch fabric. In one implementation, the monitor module 250 broadcasts messages, and monitors for messages broadcast by other nodes, such as application servers 102 and virtual I/O servers 106. In one implementation, monitor module 250 is also operative to provide a heartbeat signal or message to one or more virtual I/O servers 106, and to monitor for similar heartbeats from virtual I/O servers 106. In one implementation, when an application server 102 is initialized, the monitor module 250 automatically discovers one or more virtual I/O servers 106. Other modules of the application server 102 can then contact the discovered virtual I/O server(s) 60 to obtain configuration information. In addition, the heartbeat functionality can be used to allow the application server 102 to failover to an alternate virtual I/O server 106 in the event of fabric failure, I/O server failure, or other problems.

After discovery of one or more virtual I/O servers 106 by the monitor module 250, the virtual HBA layer 208*a* and the virtual network interface 220 of application server 102, in one implementation, are operative to establish connections with the virtual I/O server 106. As discussed herein, the virtual HBA and network layers initially use the connection to obtain configuration information to present to the operating system of the application server 102. In one implementation, virtual HBA layer 208*a* is operative to maintain a connection with virtual block interface of virtual I/O server 106, while virtual network interface 220 is operative to maintain a connection with virtual network interface. In one implementation, the respective connections are persistent, reliable connections involving a handshake protocol to set up the connection.

Figure 3:
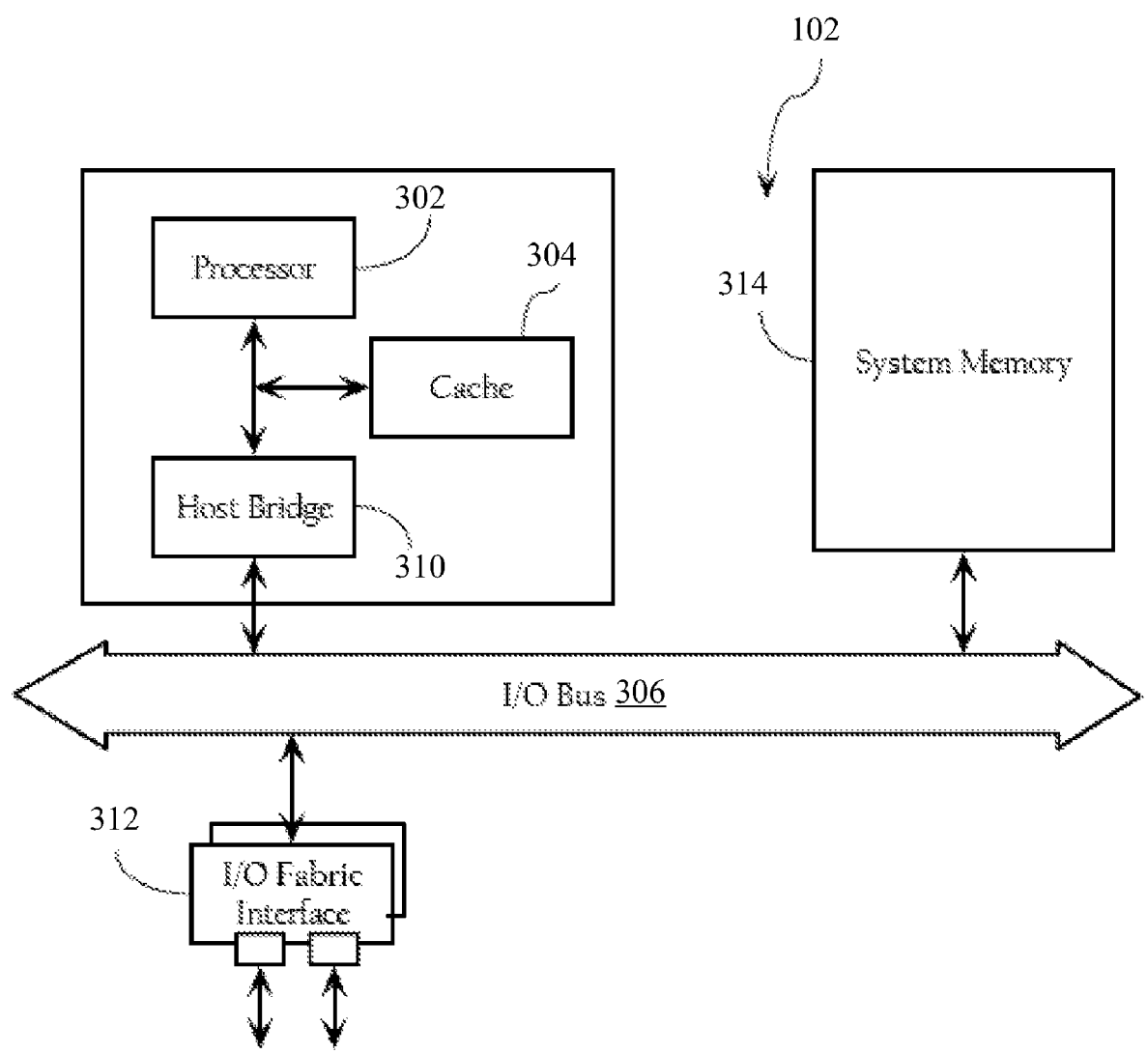
FIG. 3 is a component diagram showing hardware components of an application server according to one implementation of the invention.

Application server 102 can take a variety of forms. For example, application server 102 may range from a large mainframe system to commodity personal computer system or server system architectures. FIG. 3 illustrates for didactic purposes a hardware system, which may be used to implement an application server 102. In one implementation, application server 102 includes a processor 302, a cache memory 304, and one or more software, firmware and/or hardware modules or drivers directed to the functions described herein. Additionally, application server 102 includes an input/output (I/O) bus 306 and system memory 314. A host bridge 310 couples processor 302 to I/O bus 306. I/O bus 306 also couples to I/O fabric interface 312 to the switch fabric. Application server 102 may also include additional components, such as a management console port (e.g., a serial or USB port), mass storage (e.g., hard disk drives), ROM, EEPROMs, etc. Collectively, these elements are intended to represent a broad category of computer hardware systems, including but not limited to general purpose computer systems based on the AMD Opteron or Intel Pentium® processor, as well as any other suitable processor. Furthermore, in one implementation, application server 102 is housed in a blade housing suitable for mounting in a rack or other server blade housing.

In another implementation, an application server is a virtual machine server, hosting one or more virtual machine monitors. Virtualization software in the virtual machine server abstracts the underlying hardware by creating an interface to virtual machines, which represent virtualized resources such as processors, physical memory, network connections, and block devices. Software stacks including operating systems and applications are executed on top of the virtual machines. Several virtual machines can run simultaneously on a single physical server. In another implementation, guest operating systems running in the virtual machines can also be the application server in the virtualized environment. Guest operating systems have the capability to execute on the virtual machines just as they would on a physical system.

In one implementation, I/O fabric PHY interface 202 provides communication between application server 102 and virtual I/O server 106 over the I/O switch fabric. In one implementation, I/O fabric PHY interface 202 is a host channel adapter (HCA) implementing the Infiniband standard (above). However, I/O PHY interface 202 may be any suitable communications interface, such as an Ethernet (e.g., IEEE 802.3) network interface.

Application server 102 may include a variety of system architectures, and various components may be rearranged. For example, application server 102 may include addition processor cores or modules. In addition, cache 304 may be on-chip with processor 302. Alternatively, cache 304 and processor 302 may be packed together as a "processor module," with processor 302 being referred to as the "processor core." Furthermore, in some implementations, not all components couple directly to I/O bus 306. For example, in one implementation, application server 102 may include a high performance I/O bus 306 coupled to processor 302 (via host bridge 310) and system memory 314, and a standard I/O bus (not shown) coupled to I/O fabric interface 312 and possibly other system components. In such an implementation, an I/O bus bridge communicably couples the high performance I/O bus 806 and the standard I/O bus. Furthermore, application server 102 may include additional components, such as additional processors, storage devices, or memory modules.

In one embodiment, the operations of application server 102 described herein are implemented as a series of software routines executed by the hardware system described above. As FIG. 3 illustrates, application server 102 includes one or more applications executed in user space, as well as the storage and network protocol stacks and drivers discussed herein. These software routines comprise a plurality or series of instructions to be executed by a processor in a hardware system, such as processor 302. Initially, the series of instructions are stored on a storage device, such as a mass storage unit. However, the some or all of the series of instructions are stored remotely from application server 102. The instructions are copied into memory 314 and then accessed and executed by processor 302. An operating system manages and controls the operation of application server 102. The operating system provides an interface between the functional modules and the hardware components of the system. According to one embodiment of the present invention, the operating system is the LINUX operating system. However, the present invention may be used with other suitable operating systems, such as the Apple Macintosh Operating System, available from Apple Computer Inc. of Cupertino, Calif., UNIX® operating systems, the Windows® 95/98/NT/XP operating system, available from Microsoft Corporation of Redmond, Wash. and the like.

A.1.1 Virtual HBA Module

As discussed above, application server 102 contains a virtual storage network interface that includes a storage driver stack, a virtual HBA module, and an encapsulation layer. The virtual HBA layer 208a is assigned one or more virtual World Wide Names (WWNs). In such an implementation, a physical HBA of the virtual I/O server 106 exposes these virtual WWN on SAN I/O subsystems 114 using N-Port Identifier Virtualization (NPIV) functionality. That is, many physical HBAs include one or more ports (N_Ports), where each physical N_Port may acquire and expose multiple N_Port_IDs. The storage driver stack includes class drivers and a Small Computer System Interface (SCSI) command layer. The virtual HBA module 208a emulates a physical host bus adapter relative to the native operating system executed on the application server 102. When a virtual HBA module is loaded as a driver, it registers itself with the storage driver stack. If the storage driver stack is a SCSI stack, the storage driver stack does a scan to discover available devices. During the scan, the storage driver stack passes identify commands for all possible targets within a given namespace for transmission to the virtual HBA module. The virtual HBA module passes the commands to an encapsulation layer that encapsulates the identify commands and transmits them to the virtual I/O server 106. The host bus adapter of the virtual I/O server 106 may process the identify commands, by passing them onto the SAN I/O subsystems 114 or directly to a target 118 within the SAN I/O subsystems 114, accessing a directory of devices available to the virtual WWN, transmitting time out responses, and the like. Responses are passed back to the virtual HBA module 208a and the storage driver stack 209. In one implementation, the virtual HBA passes SCSI commands, including read, write, inquiry and mode sense, from the storage driver stack to the virtual I/O server 106 for execution. In this implementation, SCSI commands (as opposed to block requests) are encapsulated and transmitted across the I/O switch fabric 104 to the virtual I/O server 106. In other implementations, the virtual HBA module 208 can be configured to emulate a virtual block device relative to the generic block interface.

A.2. Virtual I/O Server Hardware Components and QoS Modules

Implementation of quality of service in the virtual computing environment described herein presents certain challenges. While it is desirable for the processes executed by the virtual I/O server 106 to be scalable in order to handle a large number of transactions from application servers to access the I/O subsystems, it is also desirable to offer appropriate quality of service (QoS) granularity to different types of I/O subsystems. I/O subsystems have different capacity and traffic characteristics. SAN I/O subsystems 114 such as fibre channel storage devices operate in a coordinated data transfer manner with defined data transfer size. In the other hand, LAN I/O subsystems 116 such as a LAN network interface card (NIC) tends to have bursty traffic and randomized data size. Therefore, virtual I/O server 106 needs to be scalable and offers appropriate QoS granularity to achieve optimal performance.

A.2.1. Hierarchical QoS Management

Figure 4:
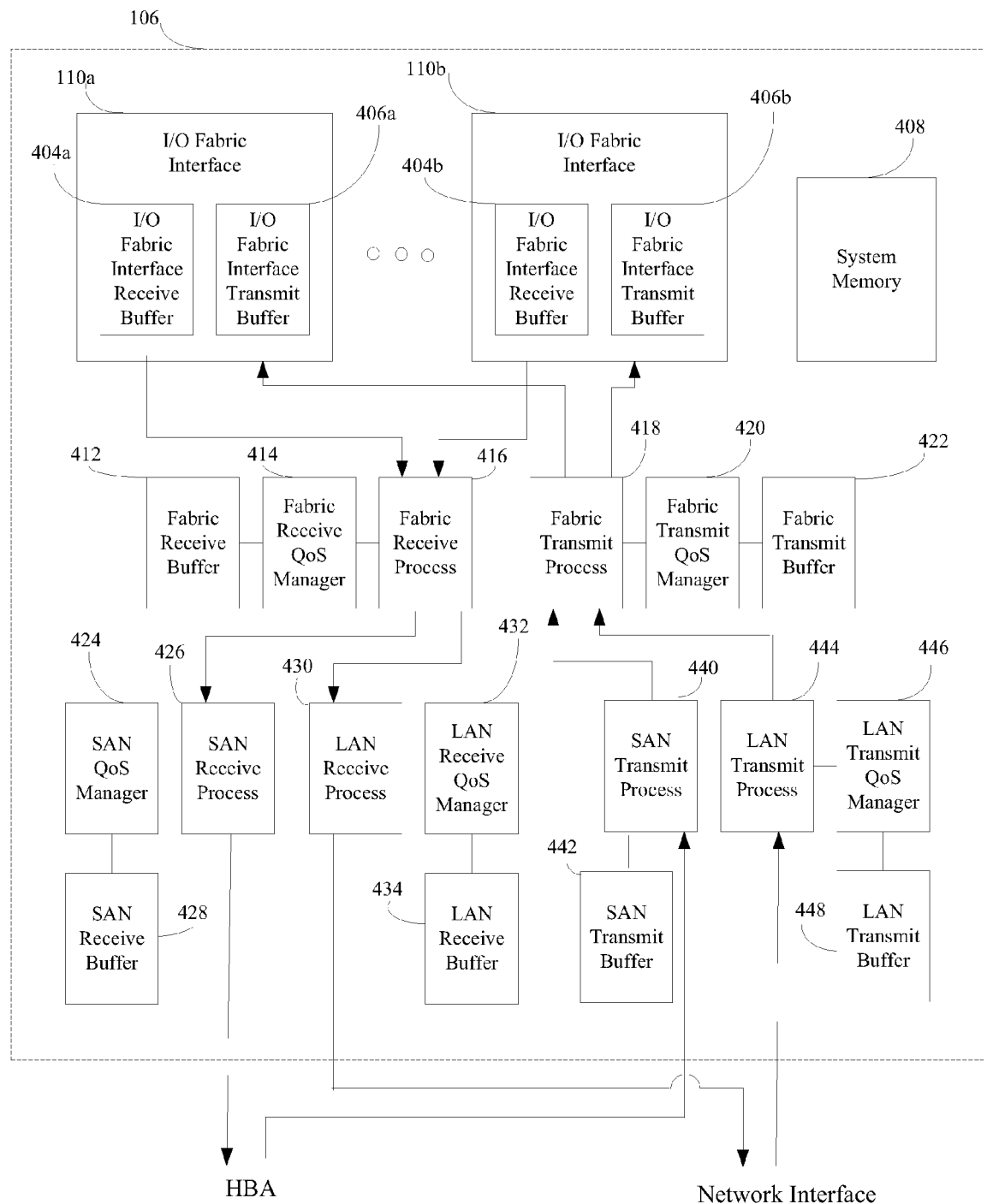
FIG. 4 is a component diagram showing the hierarchical components of the virtual I/O server QoS management process.

The present invention manages QoS of I/O subsystems in virtual I/O servers by hierarchical decomposition. The hierarchy is based on partitioning of network interfaces and I/O subsystems transaction types, with QoS allocation decisions made on each hierarchy independently. That is, QoS is performed on I/O communications from application servers 102 in various hierarchical tiers in virtual I/O server 106. The hierarchical tiers are partitioned according to network interface and I/O subsystems transaction types. QoS process at each hierarchical tier operates independently with its own QoS scheme and buffer to best optimized network performance in its perspective hierarchy. This hierarchical technique divides the QoS process into sub-processes, providing the flexibility to scale and fine tune the granularity of QoS as necessary without affecting other sub-processes. The number of hierarchies in this multi-tier QoS management process can vary in virtual I/O server 106. In one implementation, a two-tier QoS management process is illustrated in FIG. 4. The advantages of the present hierarchical QoS management process will become more evident in the following description.

FIG. 4 is a component diagram showing the two-tier hierarchical components of the virtual I/O server QoS. This two-tier QoS management process is hierarchical and scalable, separating the virtual I/O traffic QoS management process into smaller sub-processes. In FIG. 4, ingress virtual I/O communications from applications severs 102 are received by I/O fabric interface 110, with the ingress virtual I/O communications buffered in I/O fabric interface receive buffer 404 as necessary before being forwarded to fabric receive process 416. In a particular implementation, packets or frames received from, or transmitted across, the I/O switch fabric are buffered in system memory 408. I/O fabric transmit and receive buffers 404 and 406 can be implemented as transmit or receive rings containing pointers to the packets or frames buffered in system memory 408. In a particular implementation, packets or frames are transmitted to and from system memory using a remote direct memory. In addition, one or more instances of the transmit and receive buffers 404 and 406 exist for each application server 102. In the downstream direction from application server to I/O subsystem, a process, such as fabric receive process 416 arbitrates among the transmit receive buffers 404 to conditionally read packets from the transmit receive buffers 404 and forward the packets for further processing.

In one implementation, there is a one-to-one buffer relationship between each application server 102 and the virtual I/O server 106 to enable operation and management status such as congestion information to pass all the way up to file systems and the applications. This one-to-one relationship can assist in throttling communications across the I/O switch fabric 104. In one example, this one-to-one relationship can be used to create a back pressure system to control transfer between each application server 102 and the virtual I/O server 106. When application server 102 attempts to send data to virtual I/O server 106 while the I/O fabric interface receive buffer 404 is already full, application server 102 will not be able to initiate the transfer that results in transfer initiation failure due to I/O switch fabric 104 being busy.

The first hierarchical QoS process is performed by fabric receive QoS manager 414 along with fabric receive process 416 and fabric receive buffer 412. After virtual I/O communications are classified and separated into either SAN or LAN I/O subsystems groups, SAN I/O subsystems group virtual I/O communications are forwarded to SAN receive process 426 and LAN I/O subsystems group virtual I/O communications are forwarded to LAN receive process 430. The second hierarchical QoS process is performed by SAN QoS manager 424 along with SAN receive buffer 428 on SAN I/O subsystems group, and by LAN receive QoS manager 432 along with LAN receive buffer 434 on LAN I/O subsystems group. These QoS processed SAN I/O subsystems transaction and LAN I/O subsystems transaction are then forwarded to SAN I/O subsystems 114 through physical HBA 108 and LAN I/O subsystems 116 through network interface 112, respectively.

For egress virtual I/O communications, a similar hierarchical technique to ingress virtual I/O communications is employed. I/O communications from SAN I/O subsystems 114 are received at SAN transmit process 440. The first QoS hierarchical process is performed by SAN QoS manager 424 along with SAN transmit buffer 442. Similarly, I/O communications from LAN I/O subsystems 116 are received at LAN transmit process 444, and QoS allocated by LAN transmit QoS manager 446 along with LAN transmit buffer 448. These egress SAN I/O subsystems and LAN I/O subsystems transactions are then aggregated in fabric transmit process 418. The second hierarchical QoS process is performed by fabric transmit QoS manager 420 and fabric transmit buffer 422. Fabric transmit process 418 then sends these transaction to the I/O fabric interfaces where they are forwarded to I/O switch fabric 104 to reach their perspective application servers 102.

Control of each of the hierarchical QoS process can be centralized or automatically negotiated to determine the optimal QoS implementation. System memory 408 provides centralized memory resources to support all QoS hierarchical sub-processes. Each of the ingress and egress hierarchical QoS process is discussed in more details below.

A.2.2 First Hierarchical QoS Manager

Figure 12:
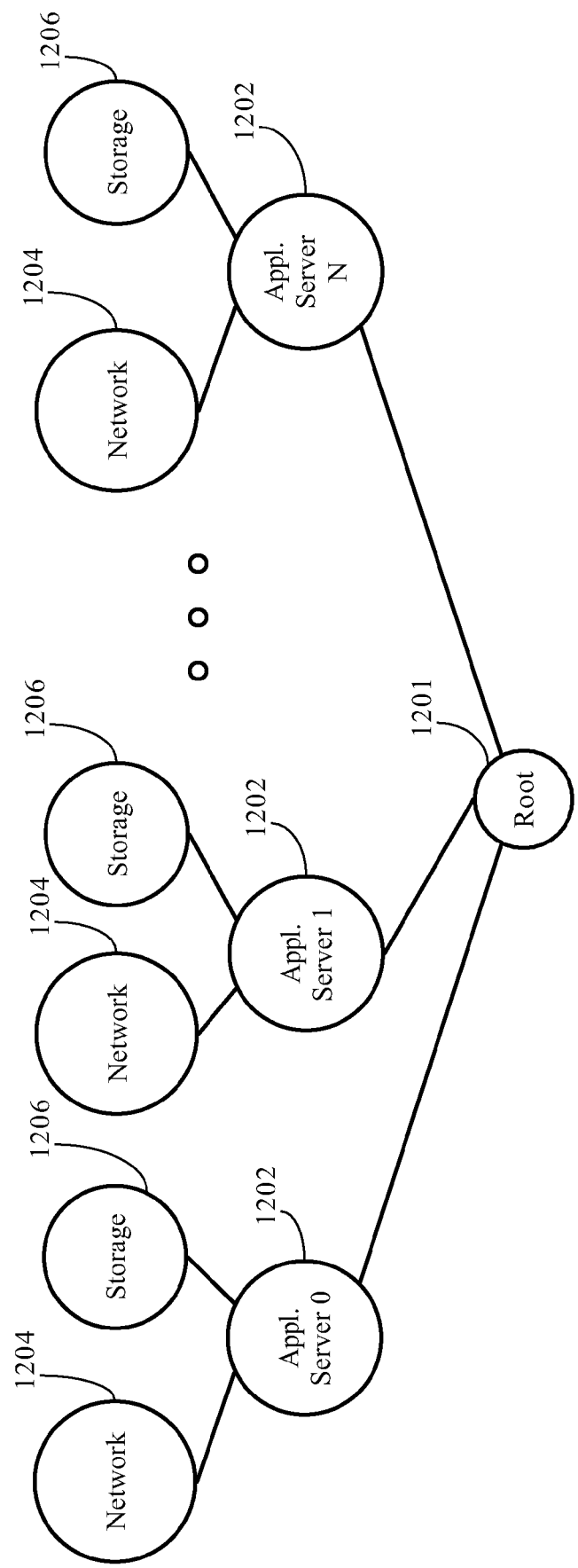
FIGS. 12 and 13 are diagrams showing example hierarchical token bucket (HTB) hierarchy configurations.

The first hierarchical ingress QoS process is provided in fabric receive QoS manager 414 along with fabric receive process 416 and fabric receive buffer 412. To optimize ingress traffic between I/O fabric interfaces 110 with I/O switch fabric 104, fabric receive QoS manager 414 is used to allocate QoS to virtual I/O communications aggregated from various I/O fabric interfaces 110. As discussed above, fabric receive process 416 initially conducts QoS on received virtual I/O communications by arbitrating among the i/o fabric receive buffers 404, using QoS schemes such as prioritization, weighted round-robin and lottery scheduler. For a given frame or packet, fabric receive process 416 and fabric receive QoS manager 414 operate to queue or forward these virtual I/O communications for further processing, using scheduling and queuing methods such as hierarchal token bucket (HTB). The fabric receive QoS manager 414 is operative to maintain a scheduling mechanism, such as a HTB scheduling mechanism, that controls whether packets are forwarded for further processing or enqueued on fabric receive buffer 412. FIG. 12 illustrates a hierarchical configuration that allocates processing resources to virtual I/O communications across a plurality of application servers. In a particular implementation, the root node 1201 may represent the physical resources of one or more I/O fabric network interfaces 110. As FIG. 12 illustrates, the resources of fabric network interface may be allocated to application servers by configuring corresponding application server nodes 1202. In the implementation shown, the resources allocated to each application server are further divided between network I/O communications 1204 and storage I/O communications.

Hierarchical token bucket can be considered as a class-based scheduling mechanism. HTB includes hierarchical classes where three class types exist: root, non-leaf and leaf. Root classes are at the top of the hierarchy, and all traffic essentially goes through them. Non-leaf classes have parent and child classes, while leaf classes have only parent classes. Incoming traffic is first classified to identify a leaf class. HTB uses the concept of tokens and buckets to schedule and shape traffic. Each class or node in the hierarchy has a bucket of tokens associated with it. HTB mechanisms allocate so-called tokens for the buckets at regular intervals. Scheduling a message or packet for transmission results in deducting an amount of tokens from a corresponding bucket, and is permitted when the corresponding bucket includes a sufficient number of tokens. In one implementation, each class has a guaranteed rate, a maximum rate, an actual or observed rate, and a priority level. High priority classes might borrow excess resource allocation (such as bandwidth) from low priority classes. For example, when the actual rate of a given class reaches its guaranteed rate, it may borrow tokens from its parent class. When a class reaches its maximum rate, packets may be queued until sufficient tokens are available. In certain implementations, the fabric receive QoS manager 414, which implements the hierarchical token bucket mechanism, acts as a permissions layer. That is, receipt of packets or frames at I/O fabric interface 110 generates interrupts that cause the fabric receive process 416 to be called. When fabric receive process 416 selects a packet, it accesses fabric receive QoS manager 414 for permission to send the packet. Fabric receive manager 414 can determine based on the state of one or more token bucket data structures and the size of the packet whether the packet can be forwarded, or whether the packet should be queued. In one implementation, if the packet is to be queued, the corresponding pointer remains on the I/O fabric interface receive buffer 404. If the I/O fabric receive buffer 404 becomes full, this may signal the application server 102 to stop transmitting data. In some implementations, the packets may be enqueued in a different buffer space, such as fabric receive buffer 412.

The fabric receive QoS manager 414 may further inspect the virtual I/O communications, and aggregates them into groups based on the type of I/O subsystems the virtual I/O communications are destined. In one implementation, the virtual I/O communications are grouped into either SAN I/O subsystems type or LAN I/O subsystems type. SAN I/O subsystems group communications are forwarded to SAN receive process 426 and LAN I/O subsystems group communications are forwarded to LAN receive process 430. Each group of virtual I/O communications is then consisted of communications with similar access characteristics. In addition, as discussed below, a more granular hierarchical resource allocation scheme can be applied to the grouped virtual I/O communications.

In one implementation, to enhance QoS management granularity, fabric receive QoS manager 414 further segregates SAN write commands destined to targets within SAN I/O subsystems 114. Fabric receive QoS manager 414 intercepts and examines the SAN write command data size, and determines if the originating application server 102 has sufficient tokens in the HTB to transmit the write data to virtual I/O server 106 over the I/O switch fabric 104. If there are sufficient tokens, tokens are deducted from the bucket based on the data size associated with the command, and the application server 102 originating the write command can begin to transmit the write data. In one implementation, the amount of tokens are deducted linearly or non-linearly (e.g., exponentially) in proportion to the data size associated with the command. These write data are stored in system memory 408. The SAN receive process 426 is notified when this SAN write command and data are ready for further processing. If the available tokens for the application server 102 originating the write command is less than the write command data size (or a metric based on the data size), then this write command is stored in fabric receive buffer 412. A corresponding time is set, and when the timer expires, the write command is processed again by fabric receive QoS manager 414.

This hierarchical QoS process allocates QoS on virtual I/O communications between one or more I/O fabric interfaces 110 over I/O switch fabric 104. It allows fine-grain control over resource allocations of the varying I/O fabric interface. For example, fabric receive QoS manager 424 will provision more bandwidth for I/O fabric interface receive buffers that are consistently overflowing, and less bandwidth for I/O fabric interface receiver buffers that are constantly under utilized. Furthermore, by intercepting SAN write command and storing the write data before forwarding to the next process, overhead for interruption of data transmission is minimized.

A.2.2.1 Fabric Receive QoS Management

Figure 5:
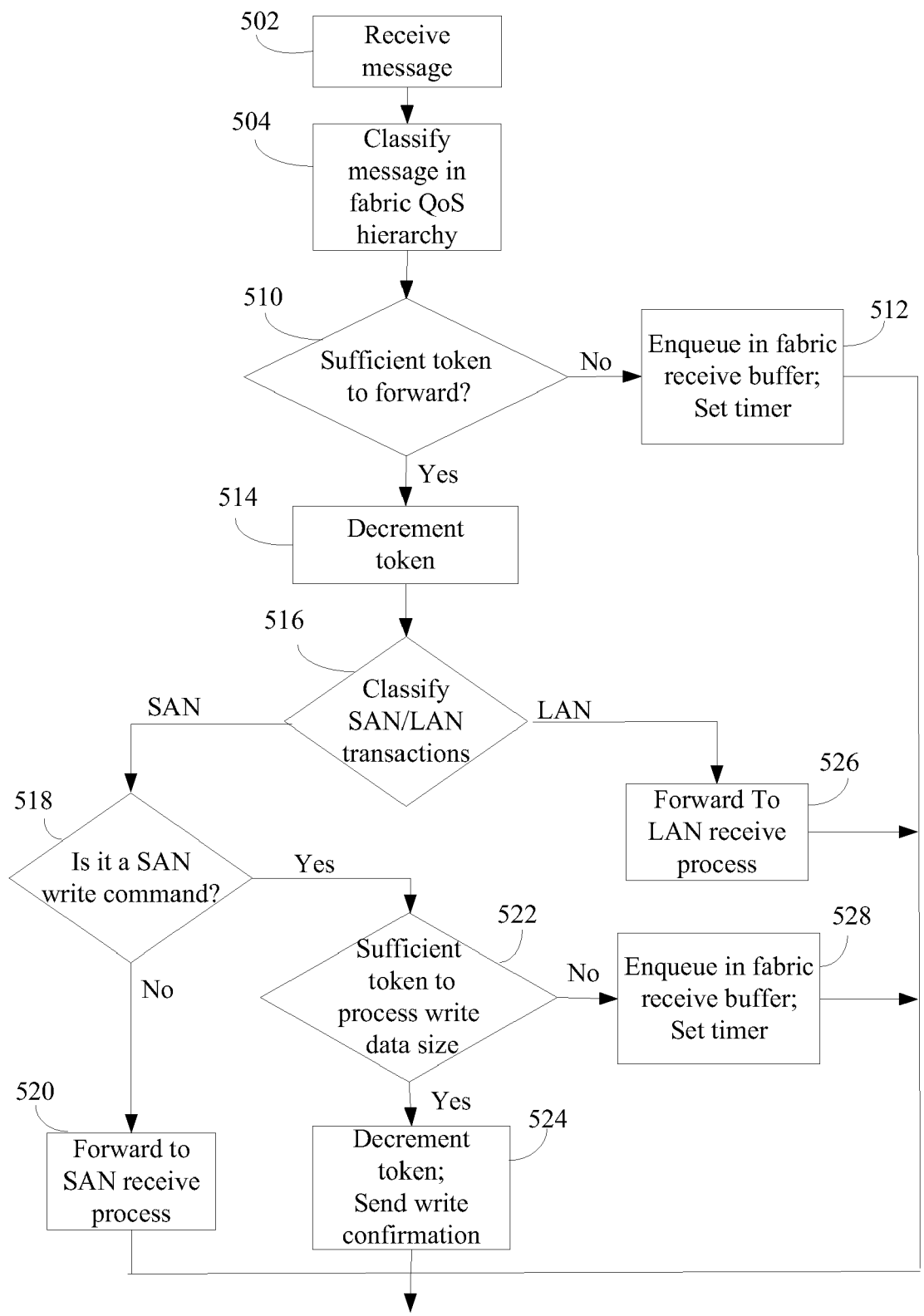
FIG. 5 is a flow chart illustrating the fabric receive QoS management operations between the application servers and the virtual I/O server.

FIG. 5 is a flow chart illustrating the operations of fabric receive QoS manager 414 along with fabric receive process 416 and fabric receive buffer 412. In step 502, fabric receive process 416 receives and aggregates virtual I/O communications from any of the I/O fabric interfaces 110. These virtual I/O communications may have been stored in I/O fabric interface receive buffer 404 if fabric receive process 416 cannot immediately service them. Fabric receive process 416 might use prioritization, weighted round-robin or lottery scheduler scheme to determine the service priority of any of the present I/O fabric interfaces. In step 504, fabric receive QoS manager 414 classifies the received virtual I/O communication using a QoS mechanism such as hierarchical token bucket (HTB). FIG. 12 illustrates one hierarchical configuration against which I/O communications can be classified. In step 510, it is determined if the application sever 102 virtual device associated with the virtual I/O communication has sufficient tokens to be forwarded. In step 512, if there are insufficient tokens, the virtual I/O communication is stored in fabric receive buffer 412 and the corresponding timer is set. At the expiration of such time, fabric receive QoS manager 414 re-evaluates the status of the stored virtual I/O communication. In step 514, if there are sufficient tokens to proceed, the corresponding tokens are deducted in fabric receive QoS manager 414. To better balance resource usage, fabric receive QoS manager 414 and fabric transmit QoS manager 420 share the same token bucket, that is, the number of tokens available are shared by fabric receive QoS manager 414 and fabric transmit QoS manager 420 for a particular application server virtual device. In step 516, fabric receive QoS manager 414 separates the virtual I/O communication into either SAN or LAN I/O subsystems groups based on the I/O subsystems destination type.

In step 518, virtual I/O communications that are SAN write commands are further evaluated. In step 522, the SAN write command data size is compared to the available tokens for the associated application server 102 virtual device. In step 524, if the SAN write command data size is less than the available tokens for the associated application server 102, the SAN write data size (or token amount based on the data size) is decremented from the token bucket, and a write notification is sent to begin processing the SAN write data. In a particular implementation, virtual I/O server 106 emulates the target identified in the write command and causes the application server 102 to transmit the data, which in one implementation, is transmitted to system memory 408. In step 528, if the SAN write command data size is greater than the available tokens for the associated application server 102 virtual device, the SAN write command is stored in fabric receive buffer 412 and the corresponding timer being set. The timer may be set based on the size of the write command and the rate at which the corresponding bucket accumulates tokens. At the expiration of such time, fabric receive QoS manager 414 re-evaluates the status of the stored SAN write command. In step 520, virtual I/O communications that are not SAN write commands are forwarded to SAN receive process 426. In step 526, virtual I/O communications destined for LAN I/O subsystems are forwarded to LAN receive process 632.

A.2.2.2 Fabric Transmit QoS Management

The first hierarchical egress QoS process is provided in fabric transmit QoS manager 420 along with fabric transmit process 418 and fabric transmit buffer 422. To optimize egress traffic between I/O fabric interfaces 110 with I/O switch fabric 104, fabric transmit QoS manager 420 is used to allocate QoS to virtual I/O communications from various I/O fabric interfaces 110. Fabric transmit QoS manager 420 conducts QoS on these virtual I/O communications using QoS schemes such as prioritization, weighted round-robin and lottery scheduler. These virtual I/O communications are queued and scheduled for further processing using queuing methods such as hierarchal token bucket (HTB). Fabric transmit process 418 aggregates the SAN and LAN I/O communications from SAN transmit process 440 and LAN transmit process 444, respectively, and de-multiplexes the virtual I/O communications to the appropriate I/O fabric interface destinations.

Figure 6:
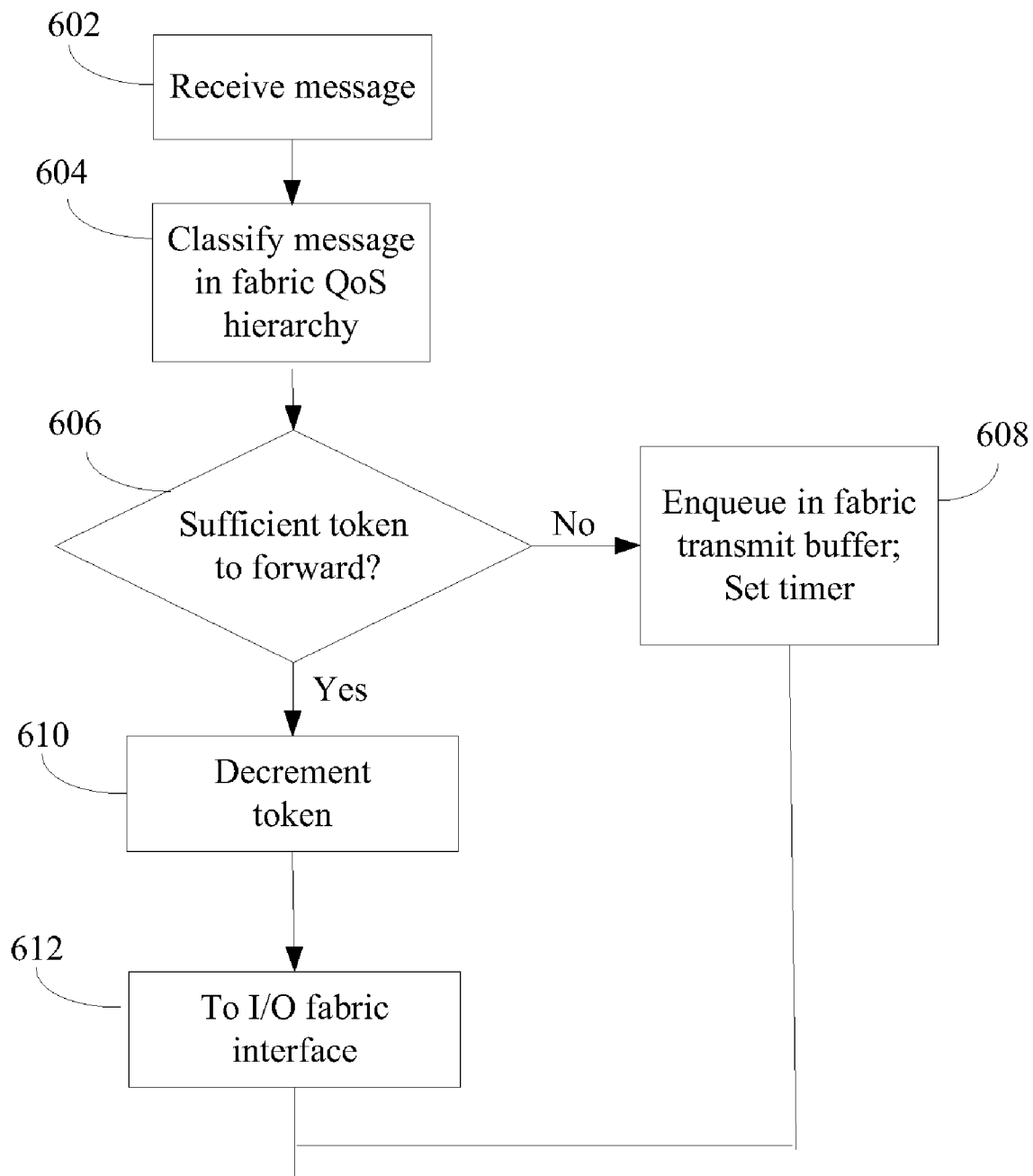
FIG. 6 is a flow chart illustrating the fabric transmit QoS management operations between the application servers and the virtual I/O server.

FIG. 6 is a flow chart illustrating the operations of fabric transmit QoS manager 420 along with fabric transmit process 418 and fabric transmit buffer 422. In step 602, fabric transmit process 418 receives and aggregates virtual I/O communications from SAN transmit process 420 and LAN transmit process 444. In step 604, fabric transmit QoS manager 420 classifies the received virtual I/O communication using a QoS mechanism, such as hierarchical token bucket (HTB). In step 606, it is determined if the application sever 102 virtual device associated with the virtual I/O communication has sufficient tokens to be forwarded. In step 608, if there are insufficient tokens, the virtual I/O communication is stored in fabric transmit buffer 422 and the corresponding timer being set. At the expiration of such time, fabric transmit QoS manager 420 re-evaluates the status of the stored virtual I/O communication. In step 610, if there are sufficient tokens to proceed, the corresponding tokens are deducted in fabric transmit QoS manager 420. To better balance resource usage, fabric receive QoS manager 414 and fabric transmit QoS manager 420 share the same token bucket, that is, the number of tokens available are shared by fabric receive QoS manager 414 and fabric transmit QoS manager 420 for a particular application server 102 virtual device. In step 612, the virtual I/O communications are forwarded to the destined I/O fabric interfaces.

A.2.3 Second Hierarchical QoS Manager

The second hierarchical QoS process imposes further QoS classification on each I/O subsystems destination groups. In one implementation, in the ingress direction, the SAN I/O subsystems destination group is processed by SAN receive process 426 along with SAN QoS manager 424 along with SAN receive buffer 428. The LAN I/O subsystems destination group is processed by LAN receive process 430 along with LAN receive QoS manager 432 and with LAN receive buffer 434. Since different I/O subsystems have different operating characteristics and requirement, the second hierarchical QoS process allocates QoS on each group based on criteria that are best suited for the I/O subsystems destination. Each group is processed by independent QoS manager and dedicated buffer for best optimized performance for the particular I/O subsystems with interference by other groups.

The second hierarchical QoS process provides much finer grain QoS control to the virtual I/O server. For communication group destined for SAN I/O subsystems, SAN QoS manager 424 can allocated QoS on different SAN commands such as read. These SAN read commands dominate the bandwidth usage of the SAN I/O subsystems as they involve the transfer of larger data size, while other commands utilize negligible bandwidth. SAN QoS manager 424 can emphasize finer QoS control over read commands, and can effectively ignore other SAN commands.

A.2.3.1 SAN Receive Subsystems QoS Management

Figure 7:
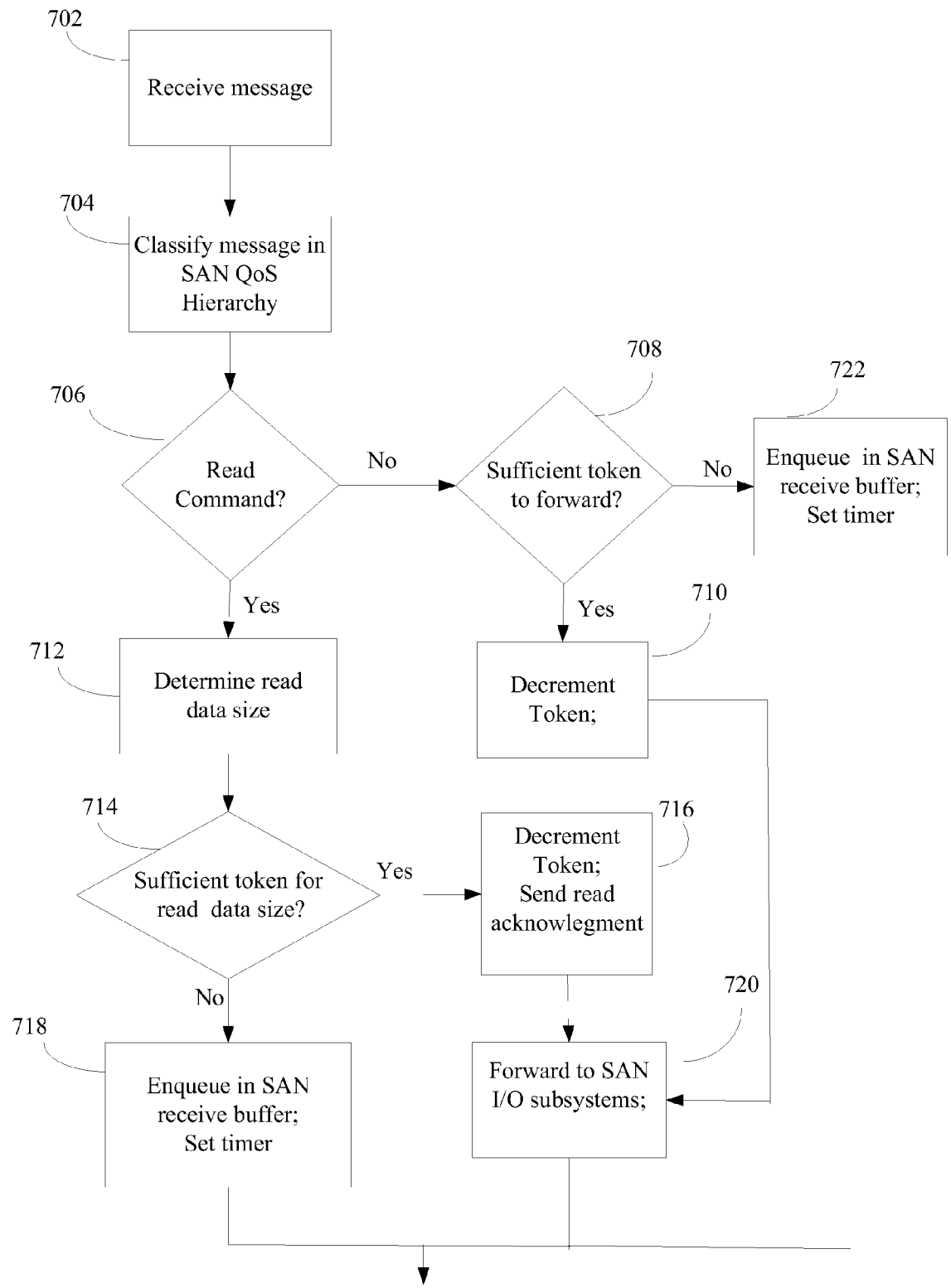
FIG. 7 is a flow chart illustrating SAN receive QoS management operations for virtual I/O communications destined for SAN I/O subsystems.
Figure 13:
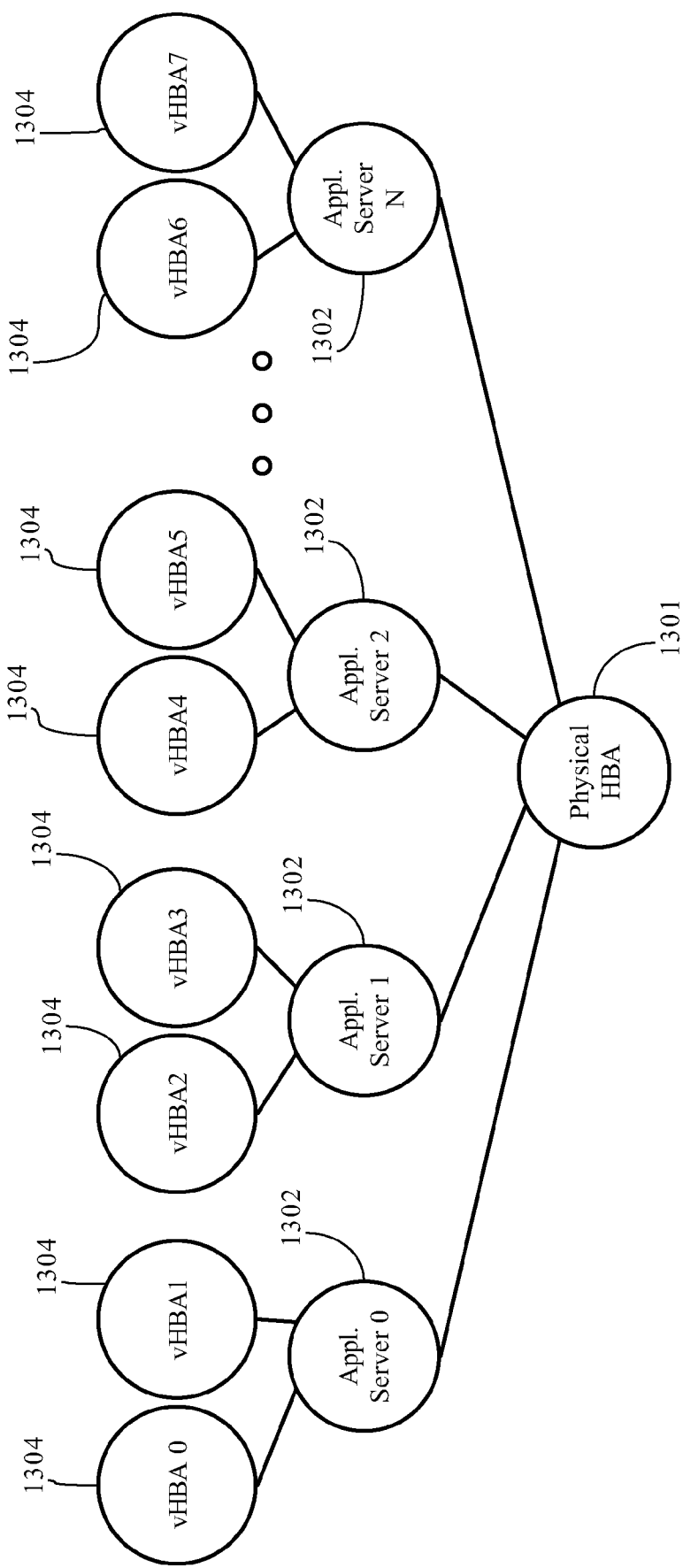

FIG. 7 is a flow chart illustrating the operations of SAN QoS manager 424 working along with SAN receive process 426 and SAN receive buffer 428 in allocating QoS on I/O transactions to SAN I/O subsystems. In step 702, the virtual I/O communications destined for SAN I/O subsystems 114 are received at SAN receive process 426. In step 704, SAN QoS manager 424 classifies the received virtual I/O communication using a QoS mechanism such as hierarchical token bucket (HTB). FIG. 13 illustrates an example hierarchical configuration against which the virtual I/O communications can be classified. As FIG. 13 illustrates, at the SAN QoS Manager 424, the hierarchical configuration is more granular than the fabric receive QoS manager 414. In that the leaf nodes, at the SAN level, correspond to virtual Host Bus Adapters associated with individual application servers, as opposed to storage and network classes. In step 706, the virtual I/O communication is analyzed to determine if it is a SAN read command. If it is a SAN read command, in step 712, the associated data size transfer of the SAN read command is determined. In step 714, it is determined if there are sufficient tokens for the application server 102 virtual device associated with the read command to process the data transfer size for the SAN read command. If there are sufficient tokens, the token bucket for the application server 102 virtual device associated with such commands is decremented by the corresponding data transfer size (or a metric based on the data transfer size) in step 716. A read notifier is forwarded to the destination target to begin transmitting the read data. In step 714, if it is determined that there are insufficient tokens to process the data size of the read command, the read command is stored in SAN receive buffer 428 and the corresponding timer is set. At the expiration of such time, SAN QoS manager 424 re-evaluates the status of the stored read command to determine the next course of action.

If the virtual I/O communication is not a SAN read command, then in step 708, it is determined if the application sever 102 virtual device associated with the virtual I/O communication has sufficient tokens to forward the virtual I/O communication. In step 722, if there are insufficient tokens, the virtual I/O communication is stored in SAN receive buffer 428 and the corresponding timer being set. At the expiration of such time, the SAN QoS manager 424 re-evaluates the status of the stored virtual I/O communication. In step 710, if there are sufficient tokens to proceed, the corresponding tokens are deducted in SAN QoS manager 424, and then the virtual I/O communication is forward to SAN I/O subsystems 114 in step 720.

In particular implementations, SAN QoS manager 424 is optimized for SAN I/O subsystems devices such as disks, tape-drives, and large storage devices. The bulk of the bandwidth usage for such SAN I/O subsystems is related to read and write operations, with other operations such as setup and management constituting a very small percentage of bandwidth usage. In the present invention, SAN QoS manager 424 is used to further classify read commands, allowing other less bandwidth intensive virtual I/O communications to proceed directly to the SAN I/O subsystems. SAN QoS manager 424 classifies the read command to determine if there are sufficient tokens in the HTB to process the data transfer size of the read command, and will store the read command until sufficient tokens are available to proceed. In this manner, the read commands can be executed and the read data be ready for further processing without tying up virtual I/O sever 106 resources arising from re-transmission due to network or time-out errors.

A.2.3.2 LAN Receive QoS Management

Figure 8:
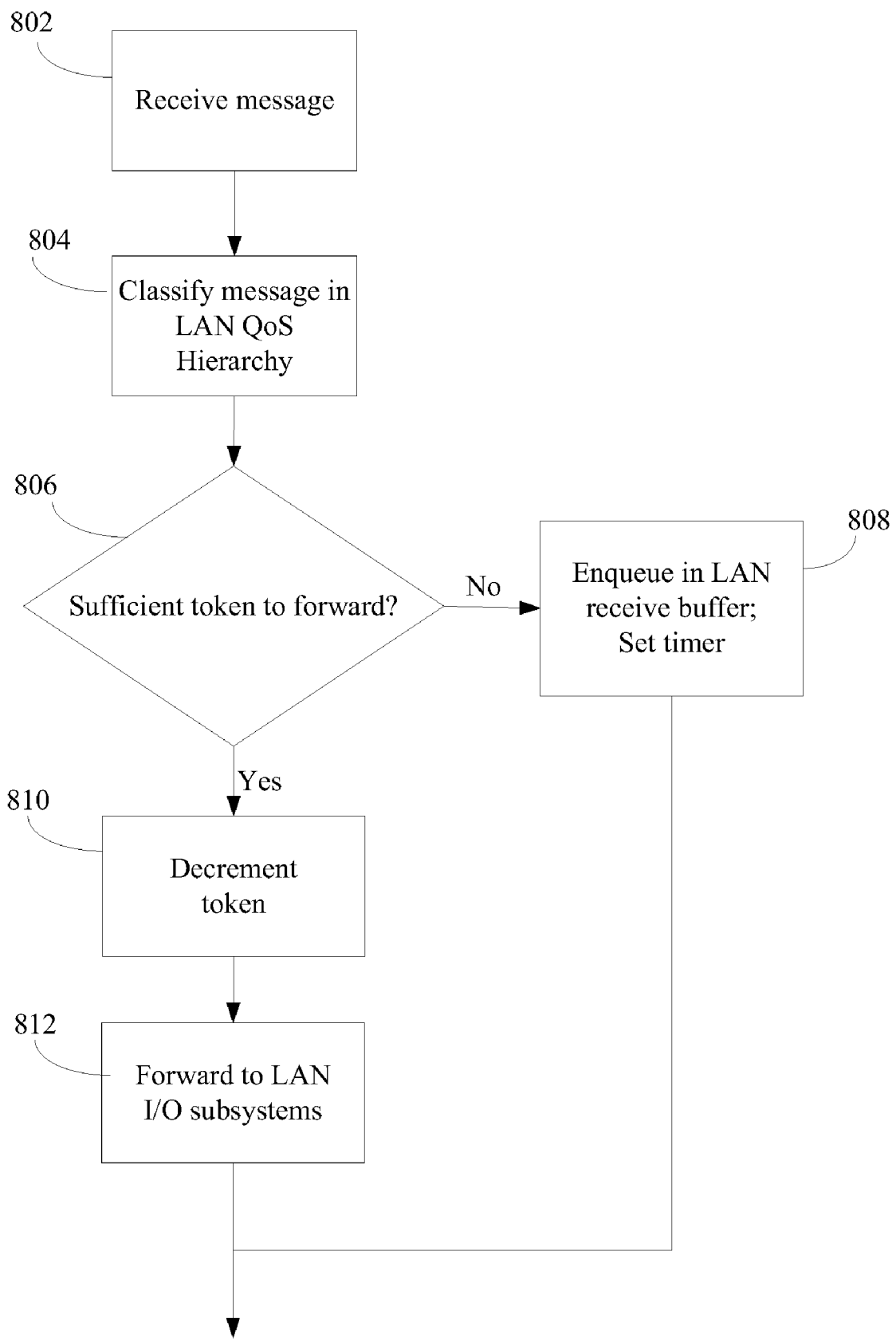
FIG. 8 is a flow chart illustrating LAN receive QoS management operations for virtual I/O communications destined for LAN I/O subsystems.

FIG. 8 is a flow chart illustrating the operations of LAN receive QoS manager 432 working along with LAN receive process 430 and LAN receive buffer 434 to assign QoS levels on I/O transactions to LAN I/O subsystems 116. In step 802, virtual I/O communications destined for LAN I/O subsystems 116 are received at with LAN receive process 430. In step 804, LAN receive QoS manager 432 classifies the virtual I/O communications using a QoS mechanism, such as HTB. In step 806, LAN receive QoS manager 432 determines if the application sever 102 virtual device associated with the virtual I/O communication has sufficient token to forward the virtual I/O communications. In step 808, if there are insufficient tokens, the virtual I/O communications is stored in LAN receive buffer 434 and the corresponding timer is set. At the expiration of such time, LAN receive QoS manager 432 re-evaluates the status of the stored transaction to determine the next course of action. If there are sufficient tokens to process the virtual I/O communications in step 806, the corresponding tokens are deducted in LAN receive QoS manager 432 in step 810. The virtual I/O communications are then forwarded to the LAN I/O subsystems in step 812. To better balance resource usage, LAN receive QoS manager 432 and LAN transmit QoS manager 446 share the same token pool, that is, the number of tokens available are shared by LAN receive QoS manager 432 and LAN transmit QoS manager 446 for a particular application server 102 virtual device.

In the present invention, LAN receive QoS manager 432 is optimized for LAN traffic applications such as Ethernet, VOIP, and multimedia videos. Such LAN traffic has different requirement bandwidth and latency that tend to be less deterministic. LAN receive QoS manager 432, with its own HTB and buffer, can better mange messages destned LAN I/O subsystems without interfering or being interfered other I/O subsystems operations.

A.2.3.3 SAN Transmit QoS Management

Figure 9:
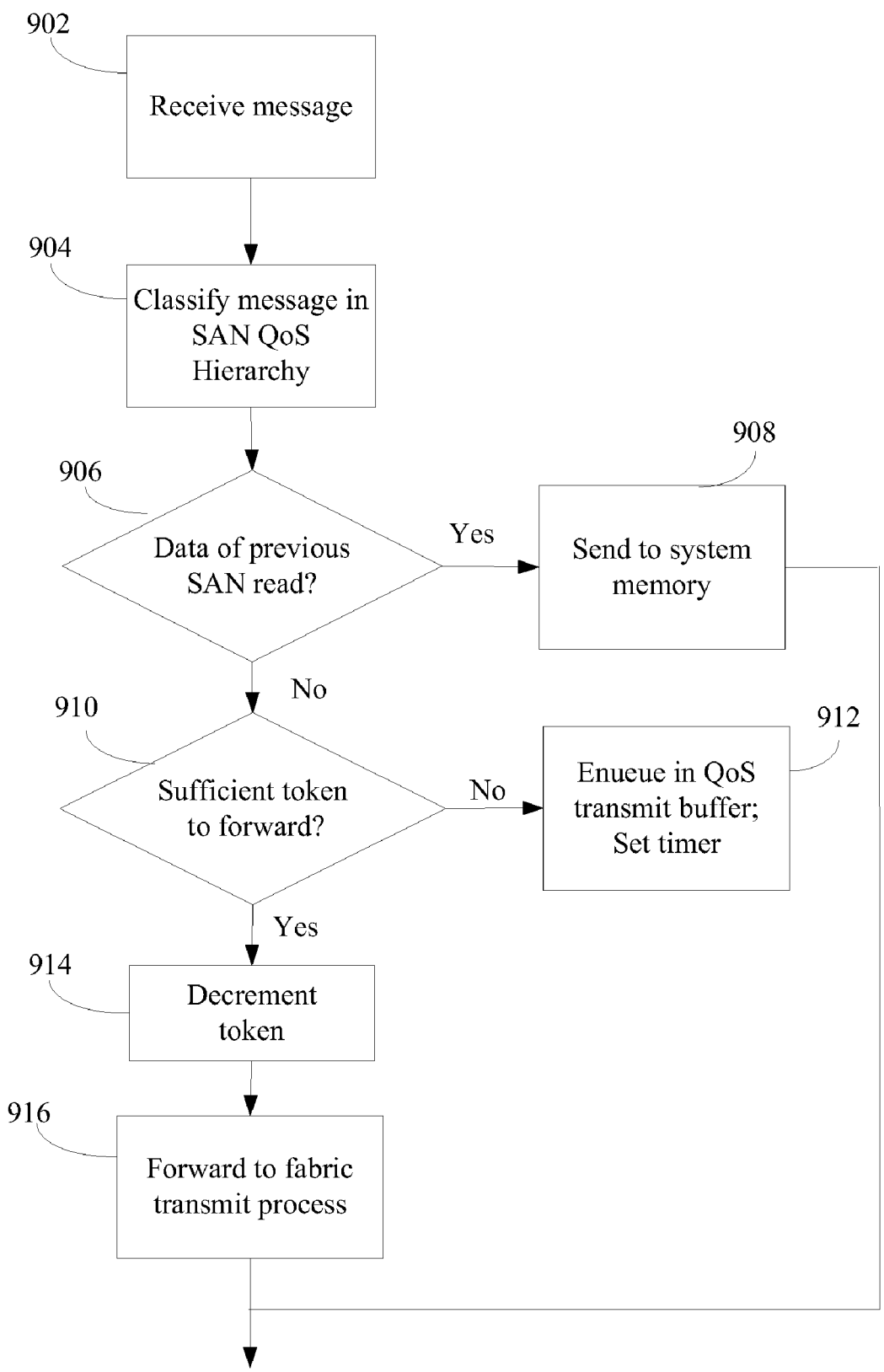
FIG. 9 is a flow chart illustrating SAN transmit QoS management operations for virtual I/O communications destined for SAN I/O subsystems.

FIG. 9 is a flow chart illustrating the operations of SAN QoS manager 424 working along with SAN transmit process 440 and SAN transmit buffer 442 to assign QoS levels on I/O transactions from SAN I/O subsystems. In step 902, virtual I/O communications from SAN I/O subsystems are received at SAN transmit process 440. In step 904, SAN QoS manager 424 classifies the virtual I/O communications using a QoS mechanism such as HTB. In step 906, SAN QoS manager 424 determines if the received virtual I/O communication is data of previous SAN read command. In step 908, these data of previous SAN read command are sent to system memory for further processing. If the virtual I/O communication is not data of previous SAN read command, then in step 910, SAN QoS manager 424 determines if the application sever 102 virtual device associated with the virtual I/O communication has sufficient tokens to forward such virtual I/O communications. In step 912, if there are insufficient tokens, the virtual I/O communications is stored in SAN transmit buffer 422 and the corresponding timer is set. At the expiration of such time, SAN QoS manager 424 re-evaluates the status of the stored transaction to determine the next course of action. If there are sufficient tokens to process the virtual I/O communications in step 906, the corresponding tokens are deducted in SAN QoS manager 424 in step 914. The virtual I/O communications are then forwarded to the fabric transmit process 418 in step 916.

A.2.3.4 LAN Transmit QoS Management

Figure 10:
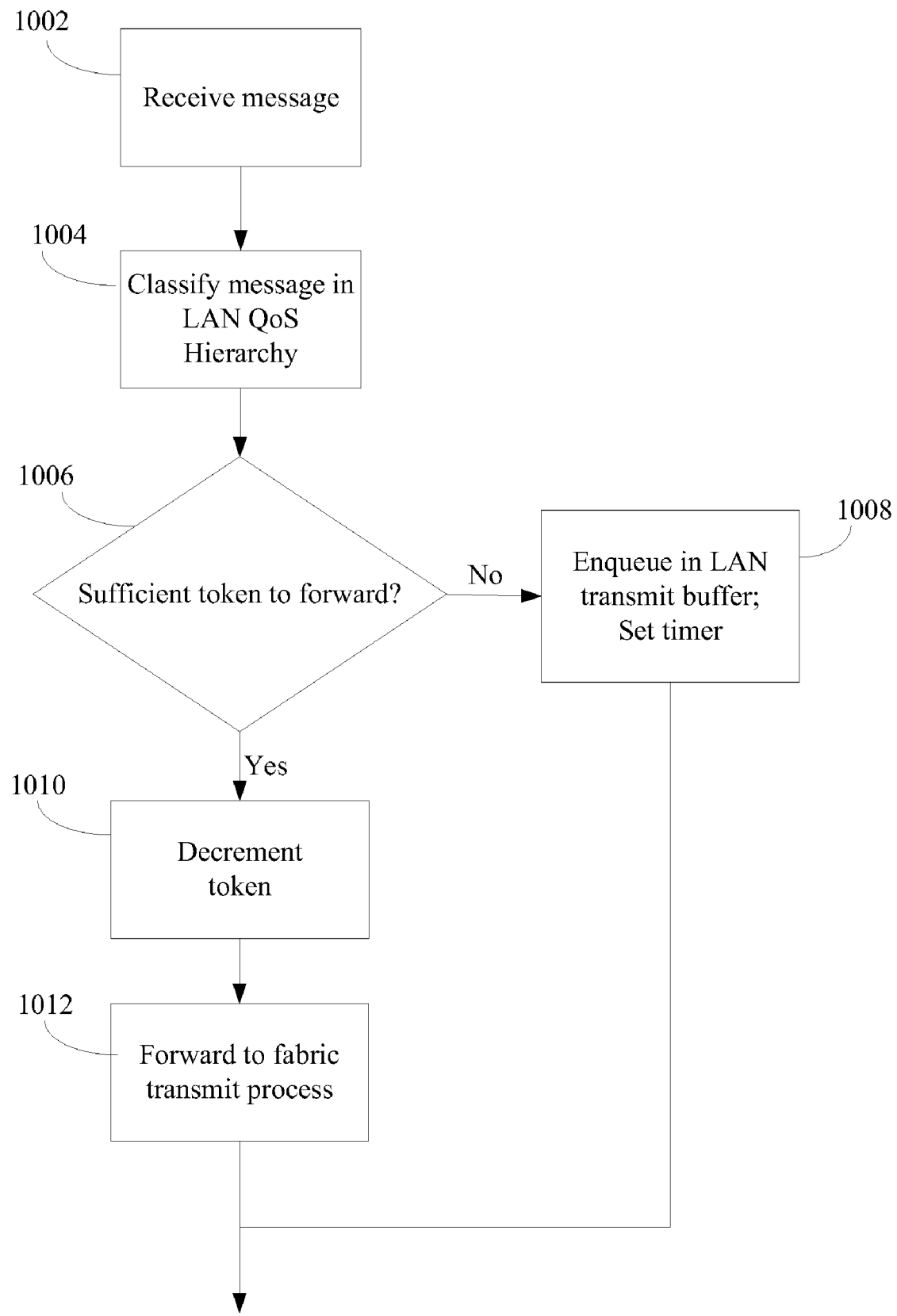
FIG. 10 is a flow chart illustrating LAN transmit QoS management operations for virtual I/O communications destined for LAN I/O subsystems.

FIG. 10 is a flow chart illustrating the operations of LAN transmit QoS manager 446 working along with LAN transmit process 444 and LAN transmit buffer 448 to assign QoS levels for I/O transactions from LAN I/O subsystems. In step 1002, virtual I/O communications from LAN I/O subsystems 116 are received at LAN transmit process 444. In step 1004, LAN transmit QoS manager 446 classifies the virtual I/O communications using a QoS mechanism such as HTB. In step 1006, LAN transmit QoS manager 446 determines if the application sever 102 virtual device associated with the virtual I/O communication has sufficient tokens to forward such virtual I/O communications. In step 1008, if there are insufficient tokens, the virtual I/O communications is stored in LAN transmit buffer 448 and the corresponding timer being set. At the expiration of such time, LAN transmit buffer 448 re-evaluates the status of the stored transaction to determine the next course of action. If there are sufficient tokens to process the virtual I/O communications, the corresponding tokens are deducted in LAN transmit QoS manager 446 in step 1010. The virtual I/O communications are then forwarded to the fabric transmit process 418 in step 1012.

B. Deployment and Operational Scenarios

B.1. SAN Read Command QoS Management Process Flow

In one implementation, the virtual I/O server 106 enables application servers 102 to read a remote physical storage device target within SAN I/O subsystems 114 as if it is physically attached. At the application server 102 where a SAN read command is initiated by a given application, the Virtual HBA 208a intercepts the SAN read command and the SAN read command is encapsulated with an identifying header in encapsulation module 206. The encapsulated SAN read command passes through the I/O fabric PHY interface 202 to a virtual I/O server 106 over the I/O switch fabric 104 for further processing.

At the virtual I/O server 106, the encapsulated SAN read command might be buffered in I/O fabric interface receiver buffer 404 and fabric receive buffer 412 depending on the congestion of the I/O switch fabric 104. When the encapsulated SAN read command reaches the SAN receive process 426, the SAN QoS manager 424 classifies the SAN read command using a QoS mechanism such as HTB. The associated data size transfer of the SAN read command is determined. If there is sufficient token to meet the data transfer size for the SAN read command to proceed, the token bucket for the application server associated with the SAN read command is decremented by the corresponding data transfer size. The token bucket for the application server is shared for both the receive and transmit process. The SAN read command is then forwarded to the SAN I/O subsystems 114 to reach the destination target of the read command. If there are insufficient tokens, the SAN read command is stored in SAN receive buffer 428 and a corresponding timer is set. Upon the expiration of this timer, the SAN read command is reprocessed by the SAN QoS manager 424.

When the SAN read command is processed by the destination target and the destination target transmits the read data to the virtual I/O server 106, the read data are forwarded directly to system memory 408 of the virtual I/O server 106 by the SAN transmit process 440 without intervention of the SAN QoS manager 424 since the tokens have already been deducted for the read data. A read notification message is sent to the fabric transmit process 418 that the read data are available at system memory for transmission. The fabric transmit QoS manager 420, using mechanism such as HTB, determines if the application server 102 associated with the read data has sufficient tokens to transmit the read data. If there are sufficient tokens, I/O fabric interface 110 associated for the read data arranges with the virtual HBA 208a of the application server 102 that originates the read command to receive the read from system memory 408. If there are insufficient tokens, the notification message is stored in fabric transmit buffer 422 with a corresponding timer set. The notification message is processed again by fabric transmit QoS manager 420 when the timer expires. The SAN read command terminated when the application receiver 102 received all its intended read data.

B.2 SAN Write Command QoS Management Process Flow

In one implementation, the virtual I/O server 106 enables application servers 102 to write to a remote physical storage device target within the SAN I/O subsystems 114 as if it is physically attached. At the application server 102 where a SAN write command is initiated by some applications, the Virtual HBA 208a intercepts the SAN write command and the SAN write command is encapsulated with an identifying header in the encapsulation module 206. The encapsulated SAN write command passes through the I/O fabric PHY interface 202 to a virtual I/O server 106 over the I/O switch fabric 104 for further processing. In one implementation, the application server 102 attempts to send the write command and the data in one step. If there are no free buffers available in buffers 404a of virtual I/O server 106, it will not get a free local buffer to initiate the transaction. This will result in the transaction initiation failing with an I/O Fabric BUSY indication. If the transmit succeeds, the write command and data will end up in I/O fabric receive buffer 404a.

At the virtual I/O server 106, the encapsulated SAN write command and data might be buffered in I/O fabric interface receive buffer until it can be processed by the fabric receive process. When the encapsulated SAN write command reaches the fabric receive process 416, the fabric receive QoS manager 414 classifies the write command using a QoS mechanism such as HTB. The associated data size transfer of the SAN write command is determined. If there are sufficient tokens to meet the data transfer size for the SAN write command to proceed, the token bucket for the application server associated with the SAN write command is decremented by an amount corresponding to the data transfer size and the write data are stored in system memory 408. The token bucket for the application server is shared for both the receive and transmit process. If there are insufficient tokens, the SAN write command is stored in fabric receive buffer 412 where a corresponding time is set. The SAN write command is processed again when the timer expires.

The SAN receive process 426 is then notified that write data are available in system memory 408 for transmission. The SAN QoS manager 424, using mechanism such as HTB, determines if the application server 102 associated for the write data has sufficient tokens to transmit the write data to the SAN I/O systems. If there are sufficient tokens, the write data are transferred from system memory 408 to SAN I/O systems 114 to reach the target of the write data. If there are insufficient tokens, the write notification message is stored in SAN receive buffer 428 with a corresponding timer set. The notification message is processed again by SAN QoS manager 424 when the timer expires. The SAN write command terminates when the transmission of write data from system memory 408 to the target of the SAN I/O systems is completed.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many other possible orderings of the steps in the processes described above and many other possible modularizations of those orderings. As a result, the invention is not limited to the specific examples and illustrations discussed above, but only by the following claims and their equivalents.

What is claimed is:

1. A method, comprising
maintaining a connection, over a network fabric, to a virtual storage network interface layer of an application server, wherein the virtual storage network interface layer is associated with a virtual storage node identifier;
presenting, at a physical storage network interface, the virtual storage node identifier to a storage area network;
enforcing a hierarchical token bucket resource allocation of bandwidth across the physical storage network interface;
receiving, over the connection, a storage command from the virtual storage network interface layer of the application server, wherein the storage command is a command to read data from, or write data to, a target connected to the storage area network;
determining a data transfer size associated with the storage command;
classifying the storage command relative to the hierarchical token bucket resource allocation to determine a current amount of tokens available;
comparing the data transfer size of the storage command to the current amount of tokens available;
processing the storage command, if the current amount of tokens available are sufficient;
forwarding the data associated with the storage command to the destination; and
buffering the storage command, if the current amount of tokens available are insufficient.

2. The method of claim 1, wherein processing the storage command, if the current amount of tokens available are sufficient, includes storing the data associated with said storage command after it has been executed.

3. The method of claim 1, further comprising, deducting the data transfer size associated with said storage command from the hierarchical token bucket, if the current amount of tokens available are sufficient.

4. The method of claim 1, wherein buffering the storage command, if the current amount of tokens available are insufficient, includes evaluating said storage command in the buffer with the amount of available tokens in the hierarchical token bucket when a timer expires, whereby said timer is set when said storage command is buffered.

5. The method of claim 4, wherein evaluating said storage command in the buffer with the amount of available tokens, includes adjusting the number of available tokens in the hierarchical token bucket based on a quality of service requirement.

6. The method of claim 1, wherein receiving, over the connection, a storage command from the virtual storage network interface layer of the application server, includes buffering said storage command in a buffer.

7. The method of claim 6, wherein buffering said storage command in a buffer, includes aggregating storage commands received from one or more connections from the virtual storage network interface layer of the application servers.

8. The method of claim 7, wherein, aggregating storage commands received from one or more connections from the virtual storage network interface layer of the application servers, includes regulating the bandwidth utilized between the application servers over the network fabric.

9. The method of claim 1, further comprising, maintaining a connection, over a network fabric, to a local area network interface layer of an application server, to receive local area network packets.

10. The method of claim 9, wherein maintaining a connection, over a network fabric, to a local area network interface layer of an application server, to receive local area network packets, includes classifying said local area network packets to the hierarchical token bucket resource allocation to determine a current amount of tokens available.

11. The method of claim 10, wherein classifying said local area network packets to the hierarchical token bucket resource allocation to determine a current amount of tokens available, includes comparing the size of said local area network packets to the current amount of tokens available.

12. The method of claim 11, wherein comparing the size of said local area network packets to the current amount of tokens available, includes forwarding said local area packets across the physical local area network to and from the target, if the size of said received local area network packets is less than or equal to the current amount of tokens available.

13. The method of claim 11, wherein comparing the size of said local area network packets to the current amount of tokens available, includes buffering said local area packets, if the size of said local area network packets is greater than the current amount of tokens available.

14. The method of claim 13, wherein buffering said local area packets, if the size of said local area network packets is greater than the current amount of tokens available, includes evaluating said local area network packets in the buffer with the amount of available tokens in the hierarchical token bucket when a timer expires, whereby said timer is set when said local area network packets are buffered.

15. The method of claim 14, wherein evaluating said local area network packets in the buffer with the amount of available tokens in the hierarchical token bucket when a timer expires, includes adjusting the number of available tokens in the hierarchical token bucket based on quality of service requirement.

16. The method of claim 1, wherein a root node of the hierarchical token bucket resource allocation corresponds to the physical storage network interface, and wherein a first node is a child node of the root node and corresponds to the application server, and a second node is a child of the first node and corresponds to the virtual storage network interface of the application server.

17. An apparatus comprising
an input/output fabric interface;
a storage network interface;
one or more processors;
a memory;
one or more input/output virtualization modules comprising computer-readable instructions operative to cause the one or more processors to:
  maintain a connection, over a network fabric, to a virtual storage network interface layer of an application server, wherein the virtual storage network interface layer is associated with a virtual storage node identifier;
  present, at a physical storage network interface, the virtual storage node identifier to a storage area network;
  enforce a hierarchical token bucket resource allocation of bandwidth across the physical storage network interface;
  receive, over the connection, a storage command from the virtual storage network interface layer of the application server, wherein the storage command is a command to read data from, or write data to, a target connected to the storage area network;
  determine a data transfer size associated with the storage command;
  classify the storage command relative to the hierarchical token bucket resource allocation to determine a current amount of tokens available;
  compare the data transfer size of the storage command to the current amount of tokens available;
  process the storage command, if the current amount of tokens available is sufficient;
  forward the data associated with the storage command to the destination and
  buffer the storage command in the memory, if the current amount of tokens available is insufficient.

18. The apparatus of claim 17, further comprising, a computation module to deduct the data transfer size associated with said storage command from the hierarchical token bucket, if the current amount of tokens available is sufficient.

19. The apparatus of claim 17, further comprising, a transportation module to transfer the stored data associated with said storage command to their destination.

20. The apparatus of claim 17, further comprising, a monitor module to evaluate storage commands stored in the buffer with the amount of available tokens in the hierarchical token bucket when a timer expires, whereby said timer is set when the storage command is buffered.

21. The apparatus of claim 20, wherein the monitor module includes a regulation module to adjust the number of available tokens in the hierarchical token bucket based on required quality of service requirement.

22. The apparatus in claim 17, wherein the input/output fabric interface includes buffers to store, aggregate, and regulate said storage commands to and from one or more application servers.

23. The apparatus in claim 17, further comprising a physical local area network interface module to transport local area network packets from application server to targets and from targets to application server over a local area network.

24. The apparatus in claim 23, wherein the local area network interface module is further operative to classify said local area network packets to the hierarchical token bucket resource allocation to determine a current amount of tokens available.

25. The apparatus in claim 23, wherein the local area network interface module is further operative to forward said local area network packets across the physical local area network to and from the target, if the size of said local area network packets is less than or equal to the current amount of tokens available.

26. The apparatus in claim 23, wherein the local area network interface module is further operative to buffer said local area network packets, if the size of said local area network packets is greater than the current amount of tokens available.

27. The apparatus in claim 23, wherein the local area network interface module is further operative to evaluate said local area network packets in the buffer with the amount of available tokens in the hierarchical token bucket when a timer expires, whereby said timer is set when said local area network packets are buffered.

28. The apparatus in claim 23, wherein the local area network interface module is further operative to adjust the number of available tokens in the hierarchical token bucket based on quality of service requirement.

29. The apparatus of claim 17, wherein a root node of the hierarchical token bucket resource allocation corresponds to the physical storage network interface, and wherein a first node is a child node of the root node and corresponds to the application server, and a second node is a child of the first node and corresponds to the virtual storage network interface of the application server.

30. A data storage medium encoded with computer executable instructions, the computer executable instructions when executed operable to cause a processor to:
  maintain a connection, over a network fabric, to a virtual storage network interface layer of an application server, wherein the virtual storage network interface layer is associated with a virtual storage node identifier;
  present, at a physical storage network interface, the virtual storage node identifier to a storage area network;
  enforce a hierarchical token bucket resource allocation of bandwidth across the physical storage network interface;
  receive, over the connection, a storage command from the virtual storage network interface layer of the application server, wherein the storage command is a command to read data from, or write data to, a target connected to the storage area network;
  determine a data transfer size associated with the storage command;
  classify the storage command relative to the hierarchical token bucket resource allocation to determine a current amount of tokens available;
  compare the data transfer size of the storage command to the current amount of tokens available;
  process the storage command, if the current amount of tokens available is sufficient;
  forward the data associated with the storage command to the destination; and
  buffer the storage command in the memory, if the current amount of tokens available is insufficient.

31. The data storage medium of claim 30, wherein a root node of the hierarchical token bucket resource allocation corresponds to the physical storage network interface, and wherein a first node is a child node of the root node and corresponds to the application server, and a second node is a child of the first node and corresponds to the virtual storage network interface of the application server.

* * * * *